United States Patent
Satoh et al.

(10) Patent No.: US 9,291,855 B2
(45) Date of Patent: Mar. 22, 2016

(54) TWISTED PNEUMATIC LCD HAVING IMPROVED LIGHT USE EFFICIENCY AND DISPLAY DEVICE

(71) Applicant: Sharp Kabushiki Kaisha, Osaka (JP)

(72) Inventors: Eiji Satoh, Osaka (JP); Kohzoh Nakamura, Osaka (JP); Hisashi Watanabe, Osaka (JP); Takahiro Nakahara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 51 days.

(21) Appl. No.: 14/386,257

(22) PCT Filed: Mar. 11, 2013

(86) PCT No.: PCT/JP2013/056577
§ 371 (c)(1),
(2) Date: Sep. 18, 2014

(87) PCT Pub. No.: WO2013/141051
PCT Pub. Date: Sep. 26, 2013

(65) Prior Publication Data
US 2015/0146131 A1    May 28, 2015

(30) Foreign Application Priority Data
Mar. 22, 2012  (JP) .................. 2012-066191

(51) Int. Cl.
G02F 1/1337    (2006.01)
G02F 1/137     (2006.01)
G02F 1/1347    (2006.01)
G02F 1/167     (2006.01)
G02F 1/17      (2006.01)

(52) U.S. Cl.
CPC .......... *G02F 1/1337* (2013.01); *G02F 1/13471* (2013.01); *G02F 1/13725* (2013.01); *G02F 1/167* (2013.01); *G02F 1/172* (2013.01)

(58) Field of Classification Search
CPC ........................ G02F 1/133526; G02F 1/336
USPC ......................................... 349/124
See application file for complete search history.

(56) References Cited

U.S. PATENT DOCUMENTS

| 6,665,042 B1 | 12/2003 | Marshall et al. |
| 7,463,328 B2 * | 12/2008 | Nakamura ............ G02F 1/1334 349/167 |
| 2007/0159678 A1 | 7/2007 | Verhaegh et al. |
| 2008/0037105 A1 | 2/2008 | Van Bommel et al. |
| 2014/0168584 A1 * | 6/2014 | Lee .................. G02F 1/133512 349/106 |

FOREIGN PATENT DOCUMENTS

| JP | 8-320505 A | 12/1996 |
| JP | 10-253993 A | 9/1998 |
| JP | 2003-533736 A | 11/2003 |
| JP | 2007-506152 A | 3/2007 |
| JP | 2008-503788 A | 2/2008 |
| WO | 01/88607 A1 | 11/2001 |
| WO | 2005/029170 A1 | 3/2005 |
| WO | 2006/000996 A1 | 1/2006 |

* cited by examiner

*Primary Examiner* — Tracie Y Green
(74) *Attorney, Agent, or Firm* — Chen Yoshimura LLP

(57) ABSTRACT

A light modulation layer of a display panel in the present invention includes shape-anisotropic members and liquid crystal molecules. The projected area of the shape-anisotropic members on a first substrate and a second substrate is changed by altering the voltage applied to the light modulation layer, which changes the orientation of the liquid crystal molecules. According to the present invention, it is possible to increase light use efficiency with a simple configuration and to control light/dark switching in both directions at a high switching speed. The present invention is applicable to a television.

22 Claims, 17 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

Uniform Diffuse Reflection Layer (b)

Directional Diffuse Reflection Layer (a)

(b)

(a) V=0

(b) V=V_app

TWISTED PNEUMATIC LCD HAVING IMPROVED LIGHT USE EFFICIENCY AND DISPLAY DEVICE

TECHNICAL FIELD

The present invention is directed to a display panel and a display device.

BACKGROUND ART

Conventional liquid crystal display panels mainly have a pair of glass substrates, a liquid crystal layer between these substrates, electrodes on each of these glass substrates, and a polarizing plate attached to each glass substrate. In this type of liquid crystal display panel, light from the backlight passes through the polarizing plates and liquid crystal layer and facilitates display of an image by the contrast on the screen. Much of the light from the backlight, however, is lost due to absorption or reflection by the time the light reaches the display screen, which is a factor in reducing light use efficiency. In particular, light loss caused by the polarizing plates has a large effect on a reduction in light use efficiency.

The reduction in light use efficiency in a conventional TN (twisted nematic) type liquid crystal display panel will be explained using FIG. 20. FIG. 20 shows the path of light that has entered a conventional liquid crystal display panel. The incident light in the drawing comes from the backlight (not shown), for example.

The incident light passes through the rear polarizing plate and becomes linearly polarized, but light loss occurs at this time. The linearly polarized light is twisted by the liquid crystal layer and passes through the front polarizing plate. Absorption at the polarizing plate optical axis, deviations in the twisting stemming from the degree of accuracy in liquid crystal orientation control, or the like causes a slight loss of light when the light passes through the front polarizing plate, even if the liquid crystal display panel is performing white display.

Patent Document 1 discloses a transflective display (FIGS. 21(a) and 21(b)) that transmits and reflects light that has entered a suspended layer containing a plurality of particles. In this transflective display, display is performed by voltage being applied to platelet-shaped metal particles, for example, in order to orient the metal particles in a vertical or horizontal direction to allow light from the backlight to pass through or to reflect external light. With this configuration, the polarizing plates can be omitted, and light use efficiency can be increased as compared to a liquid crystal display panel.

Patent Document 2 discloses an optical device (see FIG. 22) that contains polymer flakes suspended in a host. The optical device selectively changes the optical characteristics thereof by changes in the applied voltage.

When using nematic liquid crystal as the host, for example, if alternating voltage is applied to the optical device, the host will align horizontally with respect to an electric field E and the flakes will align in the direction to which the host is aligning.

In this manner, the optical device in Patent Document 2 can selectively change optical characteristics by a change in applied voltage.

RELATED ART DOCUMENTS

Patent Documents

Patent Document 1: Japanese Translation of PCT International Application Publication No. 2007-506152 (Published Mar. 15, 2007)

Patent Document 2: Japanese Translation of PCT International Application Publication No. 2003-533736 (Published Nov. 11, 2003)

SUMMARY OF THE INVENTION

Problems to be Solved by the Invention

In the transflective display in Patent Document 1, however, as shown in FIGS. 21(a) and 21(b), there is a first circuit that generates an electric field for orienting the metal particles in the direction perpendicular to the substrate, and a second circuit that generates an electric field for orienting the metal particles in the direction parallel to the substrate. This poses the problem of a complicated circuit configuration and electrode fabrication process. Specifically, as shown in FIG. 21(a), the first circuit applies a voltage V1 to electrodes 5 and 6 that have a first switch 11, and the second circuit applies a voltage V2 to electrodes 8 and 9 that have a second switch 12.

In the optical device in Patent Document 2, the electric field E can change the flakes to switch from a state parallel to the substrate to a state perpendicular thereto, or from a state perpendicular to the substrate to a state parallel thereto, but these respective changes in direction are performed by thermal dispersion or gravitational force. Therefore, it is not possible to achieve a sufficient switching speed and such an optical device cannot be used as a display device.

When using nematic liquid crystal as the host, for example, when voltage is not being applied, the flakes cannot be arranged in a uniform direction, therefore making it impossible to reversibly change the orientation of the flakes.

Therefore, when the voltage applied to the optical device is lowered in order to switch from light display to dark display, the switching speed is insufficient.

The present invention was made in view of the above-mentioned problems and aims at providing a display panel and display device that can increase light use efficiency with a simple configuration and that can control light/dark switching in both directions at a fast switching speed.

Means for Solving the Problems

To solve the above-mentioned problems, a display panel of the present invention includes: a display panel, including: a first substrate disposed on a rear side and a second substrate disposed on a display surface side, the first substrate and the second substrate facing each other; and a light modulation layer disposed between the first substrate and the second substrate, the light modulation layer controlling a transmittance of light that enters therein, wherein the light modulation layer includes a plurality of shape-anisotropic members and liquid crystal material formed of liquid crystal molecules, wherein the first substrate and the second substrate have an alignment treatment performed on the surfaces thereof facing the light modulation layer, wherein the alignment treatment is performed such that, when voltage is not being applied to the light modulation layer, the liquid crystal molecules are helically twisted around an axis perpendicular to the first substrate and the second substrate from the first substrate, or such that the liquid crystal molecules become substantially perpendicular to the first substrate and the second substrate, and wherein changing a voltage applied to the light modulation layer changes an orientation of the liquid crystal molecules, thereby changing an area projected through the shape-anisotropic members with respect to the first substrate and the second substrate in a direction normal to the first substrate and the second substrate.

With this configuration, the voltage applied to the light modulation layer is changed in order to change the orientation of the liquid crystal molecules, thereby making it possible to change the transmittance of light. Polarizing plates are not necessary, which makes it possible to increase light use efficiency more than in a display panel that uses polarizing plates.

When voltage is not being applied to the light modulation layer, even if the amount of voltage is low, the orientation of the liquid crystal molecules is determined by the alignment treatment performed on the substrates; therefore, it is possible to reversibly change the orientation of the shape-anisotropic members.

This makes it possible to increase light use efficiency with a simple configuration, and makes it possible to realize a display panel that allows switching of light/dark in both directions at a high switching speed. By controlling the orientation of the liquid crystal molecules, it is possible to perform intermediate display control with ease.

A chiral agent may be added to the liquid crystal material.

With this configuration, even when voltage is not being applied to the light modulation layer, the shape-anisotropic members are held between the liquid crystal molecules that have been regularly twisted; therefore, it is possible to reversibly change the orientation of the shape-anisotropic members.

Changing the voltage applied to the light modulation layer to change the orientation of the liquid crystal molecules also changes the orientation of the shape-anisotropic members held by the liquid crystal members, thereby making it possible to change the transmittance of light. This makes it possible to control the switching of light/dark display with ease. By controlling the orientation of the liquid crystal molecules, it is possible to perform intermediate grade display control with ease.

When voltage is not being applied to the light modulation layer, the liquid crystal molecules may twist at a 90° to 3600° angle towards the second substrate from the first substrate.

With this configuration, when voltage is not being applied to the light modulation layer, or when the amount of applied voltage is small, the shape-anisotropic members can be more stably held between the liquid crystal molecules, and thus, it is possible to accurately control the switching of light/dark display with ease. If the angle is less than 90°, the effects of having the shape-anisotropic members at the desired orientation will be small, and if the angle is greater than 3600°, the driving voltage will be large and not practical.

The shape-anisotropic members may be arranged such that a long axis of the liquid crystal molecules is substantially parallel to a largest-area-surface of the respective shape-anisotropic members.

With this configuration, it is possible to accurately change the orientation of the shape-anisotropic members in accordance with the change in orientation of the liquid crystal molecules. This makes it possible to control the switching of light/dark display with ease.

The liquid crystal molecules may have a permittivity in a long axis direction that is greater than a permittivity in a direction perpendicular to the long axis direction.

With this configuration, the angle of the long axis direction of the liquid crystal molecules to the surfaces of the first substrate and the second substrate can be made smaller in accordance with the size of voltage applied to the light modulation layer. This makes it possible to change the orientation of the shape-anisotropic members held by the liquid crystal molecules in accordance with the above-mentioned angle.

In this manner, it is possible to change the transmittance of light in accordance with the size of the voltage applied to the light modulation layer, and possible to control the switching of light/dark display with ease.

The alignment treatment may be performed such that, when voltage is not being applied to the light modulation layer, the liquid crystal molecules orient perpendicularly to the first substrate and the second substrate, and the shape-anisotropic members may be arranged such that a long axis of the liquid crystal molecules is substantially perpendicular to a largest-area-surface of the respective shape-anisotropic members.

With this configuration, even if voltage is not being applied to the light modulation layer, the long axis direction of the liquid crystal molecules will become perpendicular to the surfaces of the substrates. Furthermore, the shape-anisotropic members are secured such that the surfaces thereof become perpendicular to the long axis of the liquid crystal molecules arranged in this manner; therefore, it is possible to reversibly change the orientation of the shape-anisotropic members.

Changing the voltage applied to the light modulation layer to change the orientation of the liquid crystal molecules also changes the orientation of the shape-anisotropic members, thereby making it possible to change the transmittance of light. This makes it possible to control the switching of light/dark display with ease. By controlling the orientation of the liquid crystal molecules, it is possible to perform intermediate grade display control with ease.

The light modulation layer may transmit an amount of light that corresponds to an amount of voltage applied to the light modulation layer.

With this configuration, it is possible to control the amount of light passing through the light modulation layer by controlling the size of the voltage applied to the light modulation layer.

The shape-anisotropic members may be oriented such that an angle of a line perpendicular to a largest-area-surface of the shape-anisotropic member to a line perpendicular to a surface of the first substrate and the second substrate changes in accordance with an amount of voltage being applied to the light modulation layer.

With this configuration, controlling the size of the voltage applied to the light modulation layer makes it possible to control the angle of the line perpendicular to the surface of the substrates to the line perpendicular to the surface of the shape-anisotropic members.

In other words, controlling the size of the voltage applied to the light modulation layer makes it possible to change the projected area of the shape-anisotropic members on the first substrate and the second substrate. This makes it possible to control the amount of light that passes through the light modulation layer.

The area projected through the shape-anisotropic members with respect to the first substrate and the second substrate is changed by rotating the shape-anisotropic members in accordance with an amount of voltage applied to the light modulation layer.

The area projected through the shape-anisotropic members with respect to the first substrate and the second substrate may be changed by changing a shape of the shape-anisotropic members in accordance with an amount of voltage applied to the light modulation layer.

A portion of each of the shape-anisotropic members may be attached to the first substrate or the second substrate.

The shape-anisotropic members may be made of a metal, a semiconductor, a dielectric material, a dielectric multilayer film, or a cholesteric resin.

The shape-anisotropic members may be made of a metal and reflect light that is incident thereon.

With this configuration, controlling the orientation of the shape-anisotropic members to control the amount of light reflected by the shape-anisotropic members makes it possible to achieve a reflective display device.

The shape-anisotropic members may be colored.

The light modulation layer may function as a color filter, and the plurality of shape-anisotropic members may be made of a transparent resin, and include at least red shape-anisotropic members, green shape-anisotropic members, and blue shape-anisotropic members.

With this configuration, when transmissive display is performed, for example, color display can be performed, and when displaying black and white contents such as a digital book, it is possible to suppress light loss caused by the color filter, which makes it possible to reduce the power consumption of the backlight. When performing reflective display, color display can be performed, and it is possible to have a display that takes into account the brightness level by becoming a black and white display in dark environments where visibility is poor.

In this manner, it is possible to achieve a display device that can switch between color display and black and white display.

The shape-anisotropic members may have a flake shape, a columnar shape, or an ellipsoid shape.

The shape-anisotropic members may be formed in a flake shape that has a surface having recesses and protrusions.

With this configuration, the light reflected by the surface of the shape-anisotropic members having recesses and protrusions is scattered, with makes it possible to obtain a white display.

A thickness of the light modulation layer may be set so as to be less than a length of long axes of the shape-anisotropic members, and such that, when the shape-anisotropic members are oriented at an incline at a maximum angle with respect to the first substrate and the second substrate, light reflected by the shape-anisotropic members does not directly travel towards a display surface side.

This makes it so that light reflected by the shape-anisotropic members does not directly exit from at least the substrate on the viewer's side; thus, suitable black display can be performed.

Colored layers may be formed on the first substrate.

With this configuration, it is possible to achieve a reflective display device that switches between the reflected colors from the shape-anisotropic members and the colors of the colored layers.

In order to solve the above-mentioned problems, a display device of the present invention includes: the above-mentioned display panel; and a backlight disposed on the first substrate side.

With this configuration and the display panel, by controlling light transmission of the light that is emitted from the backlight, it is possible to achieve a transmissive display device has high light use efficiency with a simple configuration and that can control switching of light/dark display with ease.

The above-mentioned display device may include a reflective display mode that performs display by reflecting external light and a transmissive display mode that performs display by transmitting light from the backlight, and display may be performed by switching between the reflective display mode and the transmissive display mode.

In the reflective display mode, display may be performed by the external light being reflected by the shape-anisotropic members, and in the transmissive display mode, display may be performed by the light from the backlight passing through the light modulation layer.

Effects of the Invention

As described above, a display panel of the present invention includes: a first substrate disposed on a rear side and a second substrate disposed on a display surface side, the first substrate and the second substrate facing each other; and a light modulation layer disposed between the first substrate and the second substrate, the light modulation layer controlling a transmittance of light that enters therein, wherein the light modulation layer comprises a plurality of shape-anisotropic members and liquid crystal material formed of liquid crystal molecules, wherein the first substrate and the second substrate have an alignment treatment performed on the surfaces thereof facing the light modulation layer, wherein the alignment treatment is performed such that, when voltage is not being applied to the light modulation layer, the liquid crystal molecules are helically twisted around an axis perpendicular to the first substrate and the second substrate from the first substrate, or such that the liquid crystal molecules become substantially perpendicular to the first substrate and the second substrate, and wherein changing a voltage applied to the light modulation layer changes an orientation of the liquid crystal molecules, thereby changing an area projected through the shape-anisotropic members with respect to the first substrate and the second substrate in a direction normal to the first substrate and the second substrate.

Thus, it is possible to provide a display panel and a display device that can increase light use efficiency with a simple configuration and that can control light/dark switching in both directions at a fast switching speed.

BRIEF DESCRIPTION OF THE DRAWINGS

FIGS. 8(a) and 8(b) are views showing the progression of light when the display device according to Embodiment 2 is see-through.

DETAILED DESCRIPTION OF EMBODIMENTS

Below, embodiments of the present invention will be explained in detail.

<Embodiment 1>

One embodiment of the present invention will be explained below with reference to FIGS. 1 to 5.

<Display Device>

Figure 1:
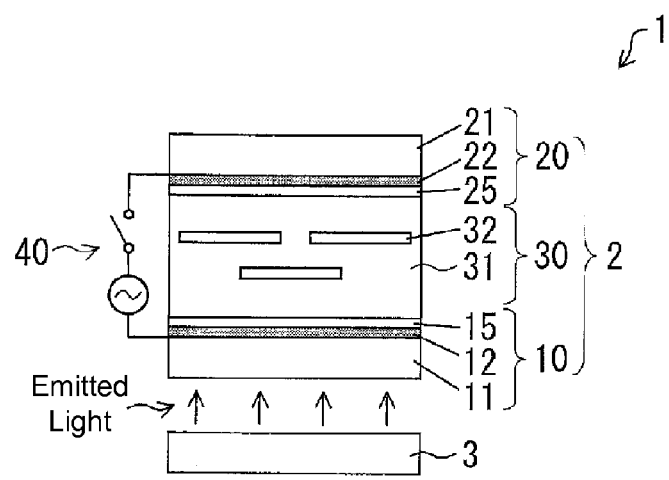
FIGS. 1(a) and 1(b) are cross-sectional views of a schematic configuration of a display device according to Embodiment 1.
Figure 1:
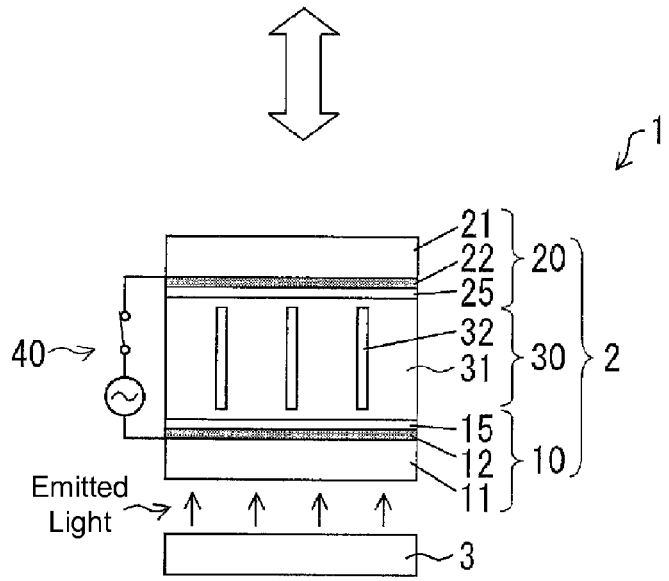

FIG. 1 is a cross-sectional view showing a schematic configuration of a display device 1 of the present invention. The display device 1 includes a display panel 2, a backlight 3 disposed facing this display panel 2, and driving circuits (not shown).

The display device 1 is a transmissive display device that performs display by allowing light emitted from the backlight 3 to pass through the display panel 2.

The configuration of the backlight 3 is conventional. Accordingly, an explanation of the configuration of the backlight 3 will be omitted. An edge-lit or direct-lit light source device or the like can be appropriately used for the backlight 3, for example. Fluorescent tubes, LEDs, or the like can be appropriately used as the light source for the backlight 3.

<Display Panel>

The display panel 2 of the present invention includes a pair of substrates 10 and 20 arranged facing each other, and a light modulation layer 30 disposed between this pair of substrates 10 and 20. The substrate 10 (first substrate) is disposed on the backlight 3 side (rear side) and the substrate 20 (second substrate) is disposed on the display surface side (viewer's side). The display panel 2 has a large number of pixels arranged in rows and columns.

<Substrates>

The substrate 10 includes a transparent glass substrate 11 as an insulating substrate, an electrode 12, and an alignment film 15, for example. The glass substrate 11, the electrode 12, and the alignment film 15 are stacked in this order.

The substrate 20 includes a transparent glass substrate 21 as an insulating substrate, an electrode 22, and an alignment film 25, for example. The glass substrate 21, the electrode 22, and the alignment film 25 are stacked in this order.

The substrate 10 and the substrate 20 are provided such that the surfaces on which the alignment films 15 and 25 are formed face each other through the light modulation layer 30 therebetween.

The substrate 10 is an active matrix substrate. Specifically, the substrate 10 has, on the glass substrate 11, various types of signal wiring lines (scan signal lines, data signal lines, and the like), thin-film transistors ("TFTs"), and an insulating film. The electrodes 12 (pixel electrodes) are arranged on top of these. The configuration of the driving circuits that drive the various types of signal wiring lines (scan signal line driving circuit, data signal line driving circuit, and the like) is a conventional configuration.

The electrode 12 formed on the substrate 10 and the electrode 22 formed on the substrate 20 may be a conductive electrode film such as ITO (indium tin oxide) or an aluminum-deposited layer, and may be patterned such that segment display or passive display is possible.

The alignment film 15 formed on the substrate 10 and the alignment film 25 formed on the substrate 20, as described later, undergo an alignment treatment such that liquid crystal molecules 33 in the light modulation layer 30 have a twist orientation. Specifically, a method can be used in which a polyimide film is deposited at 800 Å and then a rubbing treatment is performed on this film, for example. However, the present invention is not limited to this method, and any well-known method can be used.

It is preferable that an alignment treatment be performed such that, when no voltage is being applied to the light modulation layer 30, the liquid crystal molecules 33 have a twist angle of 90° to 3600° from the substrate 10 towards the substrate 20.

<Light Modulation Layer>

The light modulation layer 30 includes liquid crystal material 31 constituted of the large number of liquid crystal molecules 33, and shape-anisotropic members 32.

Voltage is applied to the light modulation layer 30 by a power source 40 connected to the electrodes 12 and 22, and the light modulation layer 30 changes the transmittance of light that has entered therein from the backlight 3 in accordance with the change in applied voltage.

The liquid crystal material 31 has a twist orientation between the substrates 10 and 20. It is possible to use chiral nematic liquid crystal in which a chiral agent has been added to nematic liquid crystal, for example. The concentration of the chiral agent depends on the type thereof and the type of the nematic liquid crystal. In a panel in which the orientation direction (rubbing direction) of the alignment film 15 and the orientation direction of the alignment film 25 are shifted 90° to each other and in which the thickness (cell thickness) of the light modulation layer 30 therebetween is 45 µm, the concentration of the chiral agent is adjusted such that the chiral pitch is 70 µm.

A positive type (P-type) liquid crystal having a positive dielectric anisotropy may be used for the nematic liquid crystal, or a negative type (N-type) having a negative dielectric anisotropy may be used for the nematic liquid crystal. In the explanations below, unless otherwise specified, the P-type liquid crystal will be used.

The shape-anisotropic members 32 are members that respond to the direction of an electric field by rotating, and the liquid crystal may be oriented parallel to the surface of these members. In terms of display characteristics, the shape-anisotropic members 32 may have a shape whose surface area of a projection image seen from a direction normal to the substrate changes when voltage is applied. It is preferable that the area ratio of the projection image be at least 2:1.

It is possible to select a flake shape, a columnar shape, an ellipsoid shape, or the like, for example. When using the flake shape, it is preferable that the thickness thereof be 1 µm or below, and more preferably be 0.1 µm or below. When the flakes are thin, transmittance can be increased.

A metal, a semiconductor, or a dielectric can be used as the material for the flakes, or a composite material of these may be used. If using metal, then it is possible to select aluminum flakes that are used for coating, for example.

The flakes may colored members, a dielectric multi-layered film, or a cholesteric resin. In all cases, however, it is necessary that the liquid crystal be oriented parallel to the surface of these members. "Parallel" does not need to be strictly parallel, and may be substantially parallel.

Processing is not particularly necessary when using a material with a high surface tension such as a cholesteric resin or metal, for example, in order to orient the liquid crystal molecules 33 parallel to the surface of the shape-anisotropic members 32. However, when using a material that is hydrophobic and the liquid crystal molecules 33 do not orient parallel to the surface of the shape-anisotropic members, it is necessary to form a resin film or the like by using a method such as dip-coating.

The specific gravity of the shape-anisotropic members 32 is preferably 11 $g/cm^3$ or below, and more preferably 3 $g/cm^3$ or below, and even more preferably equal to the specific gravity of the liquid crystal material 31. This is because when the specific gravity of these members differs greatly from the liquid crystal material 31, the shape-anisotropic members 32 settle out.

<Transmissive Display>

Next, a method of controlling the transmittance of light with the light modulation layer 30 will be explained. The shape-anisotropic members 32 will be described below as being flakes.

Figure 2:
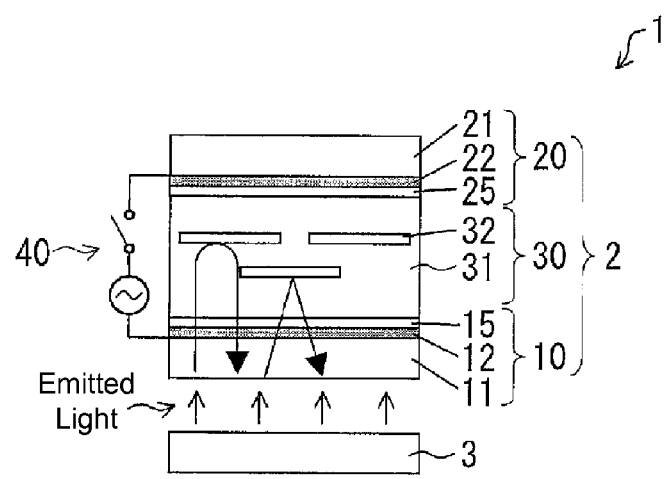
FIG. 2(a) shows the progression of light in the configuration in FIG. 1(a)
FIG. 2(b) shows the progression of light in the configuration in FIG. 1(b).
Figure 2:
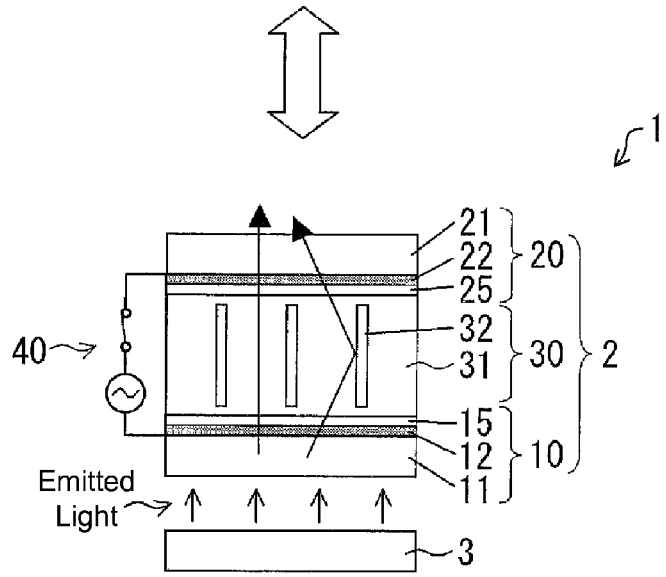

FIG. 2 is a cross-sectional view of the display device 1 that performs transmissive display, FIG. 2(a) shows when the amount of light transmitted in the display device 1 is small, and FIG. 2(b) shows when the amount of light transmitted in the display device is large.

As shown in FIG. 2(a), the flakes are oriented (horizontally oriented) such that the lengthwise direction of the flakes is parallel to the substrates 10 and 20, thereby blocking light.

With this type of horizontal orientation, the surface of the flakes is oriented parallel to the substrates 10 and 20, and the light that has entered is reflected by this surface and does not pass through the surface opposite to where the light enters.

On the other hand, as shown in FIG. 2(b), the flakes are oriented (vertically oriented) such that the lengthwise direction of the flakes is perpendicular to the substrate surfaces of the substrates 10 and 20, thereby allowing light that has entered to pass through.

"Allowing light that has entered to pass through" includes both light that has entered passing directly through and also light that has been reflected by the reflective surface of the flakes passing through to the surface on the opposite side where the light entered.

If a backlight is disposed on the rear surface, then a transmissive display such as a liquid crystal display can be performed.

<Orientation Control of Shape-Anisotropic Members>

Figure 3:
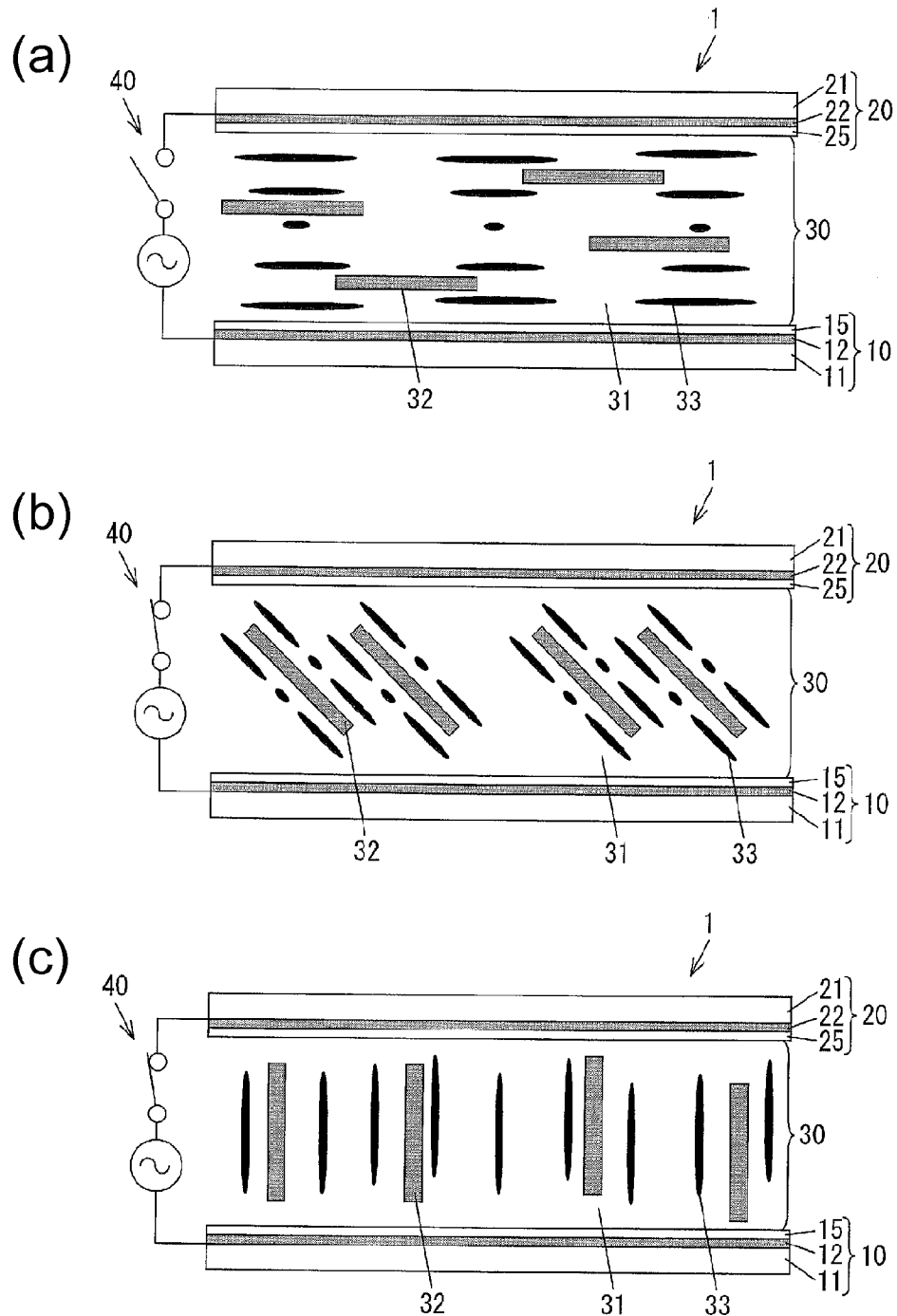
FIG. 3(a) is a view of the orientation of liquid crystal molecules and shape-anisotropic members in FIG. 2(a)
FIG. 3(c) is a view of the orientation of the liquid crystal molecules and shape-anisotropic members in FIG. 2(b)
FIG. 3(b) is a view of the orientation state between the orientations of FIGS. 3(a) and 3(c).

Next, a method of controlling the orientation of the flakes will be specifically described using FIG. 3. FIG. 3 shows the flakes, which are the shape-anisotropic members 32, and the orientation of a portion of the liquid crystal molecules 33 in the liquid crystal material 31.

The orientation direction of the alignment film 25 in a plan view is at a 180° angle to the orientation direction of the alignment film 15. This twists the liquid crystal molecules 33 into a spiral shape perpendicular to the surface of the substrate 10 and the substrate 20 when no voltage is being applied to the light modulation layer 30. The liquid crystal molecules 33 have mutually different long-axis directions and are separated at a certain distance at least in the direction perpendicular to the surface of the substrates.

P-type liquid crystal is used for the liquid crystal material 31.

FIG. 3(a) shows the orientation of the flakes and the liquid crystal molecules 33 when no voltage is being applied to the light modulation layer 30, and FIGS. 3(b) and 3(c) show the orientation of the flakes and the liquid crystal molecules 33 when voltage is being applied to the light modulation layer 30.

Driving circuits (not shown) control the voltage applied to the light modulation layer 30 in FIG. 3(b) such that this voltage becomes lower (smaller) than the voltage applied to the light modulation layer 30 in FIG. 3(c).

As shown in FIG. 3(a), when voltage is not being applied to the light modulation layer 30, the liquid crystal molecules 33 have a spiral axis oriented perpendicularly to the surface of the substrates 10 and 20 along the orientation direction of the alignment films 15 and 25. In other words, the liquid crystal molecules 33 are twisted at a 180° angle between the substrates 10 and 20.

When the flakes move such that the liquid crystal molecules 33 are oriented parallel to the surface of the flakes, the surface of the flakes becomes parallel to the surface of the substrates when voltage is not being applied to the light modulation layer 30. In other words, the flakes are horizontally oriented at this time.

The flakes are supported in two directions (two axes) by the liquid crystal molecules 33 on one surface and the liquid crystal molecules 33 on the other surface. This causes the flakes to be held by restraining force from the liquid crystal molecules 33 and to be oriented horizontally.

As shown in FIG. 3(b), if voltage is applied to the light modulation layer 30, then the angle of the long axis direction of the liquid crystal molecules 33 to the surface of the substrates becomes greater in accordance with the applied voltage.

The long axes of the flakes rotate to approach a position parallel to the lines of electric force and become vertically oriented due to forces explained by dielectrophoretic force, Coulomb's force, and electrical energy, and due to forces that make the interface energy with the liquid crystal very small.

This also causes a change in orientation of the flakes and a change in the angle of the perpendicular line of the surface of the flakes having the largest area to the perpendicular line of the surface of the substrates 10 and 20.

As shown in FIG. 3(*c*), if the voltage applied to the light modulation layer 30 is constant, then the long axis direction of the liquid crystal molecules 33 are oriented so as to be perpendicular to the surface of the substrates 10 and 20.

This causes the angle of the perpendicular line of the surface of the flakes having the largest area to the perpendicular line of the surfaces of the substrates 10 and 20 to be perpendicular to each other.

When using P-type liquid crystal as the liquid crystal material 31, the tilt of the liquid crystal molecules 33 to the surface of the substrates takes an intermediate state in accordance with the amount of voltage applied to the light modulation layer 30; therefore, the tilt of the flakes to the surface of the substrates can also take an intermediate state.

This allows an amount of light corresponding to the amount of voltage applied to the light modulation layer to pass through, and an intermediate grade of display can be performed with ease in the display device 1.

Figure 4:
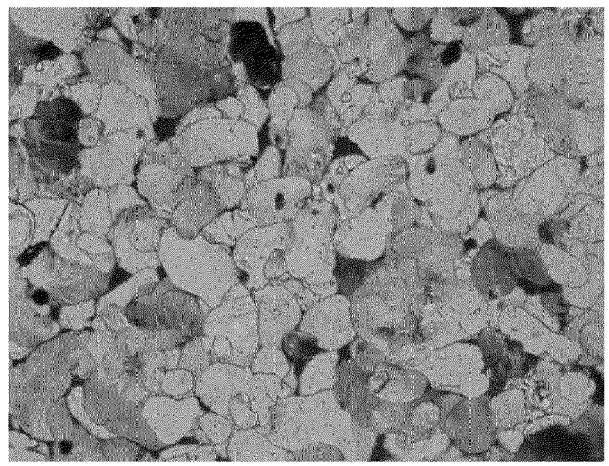
FIG. 4(a) is an image of the appearance (plan view) when flakes are oriented horizontally.
FIG. 4(b) is an image of the appearance (plan view) when the flakes are oriented vertically.
Figure 4:
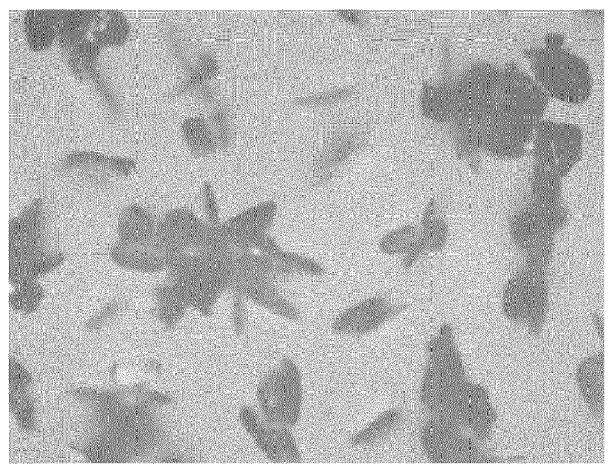

FIG. 4(*a*) is an image of the appearance (plan view) when no voltage is applied to the light modulation layer 30 and the flakes are horizontally oriented. FIG. 4(*b*) is an image of the appearance (plan view) when voltage is applied to the light modulation layer 30 and the flakes are vertically oriented.

As described above, changing the amount of voltage applied to the light modulation layer 30 makes it possible to reversibly control the orientation of the flakes (makes switching possible).

As described above, when using P-type liquid crystal, the liquid crystal molecules 33 become homeotropically oriented following voltage being applied, and in accordance with this, the flakes lose the horizontal orientation restraining force and can rotate to vertical orientation.

When N-type liquid crystal is used as the liquid crystal material 31, if voltage is not being applied to the light modulation layer 30, then the liquid crystal molecules 33 become oriented such that the long axis direction thereof is parallel to the surface of the substrates. Therefore, the flakes are oriented horizontally.

Even if a voltage is applied to the light modulation layer 30, the orientation of the N-type liquid crystal molecules 33 does not change. However, due to forces explained by dielectrophoretic force, Coulomb's force, and electrical energy, the orientation of the flakes becomes vertical. When the applied voltage is lowered, the liquid crystal molecules 33 receive restraining force, which can quickly return the flakes to the horizontal orientation.

When using N-type liquid crystal, even if voltage is applied to the light modulation layer 30, the liquid crystal molecules 33 are constantly exerting a horizontally orienting force on the flakes. By balancing the rotational torque of the flakes generated by the applied voltage with the horizontally orienting restraining force of the liquid crystal molecules 33, an intermediate grade of display can be performed with ease in the display device 1.

As described above, the display device 1 can increase light use efficiency with a simple configuration. The orientation of the shape-anisotropic members 32 does not rely on the presence or absence of applied voltage to the light modulation layer 30, thus allowing for light/dark switching to be controlled at high switching speeds in both directions.

<Comparison Example>

Figure 5:
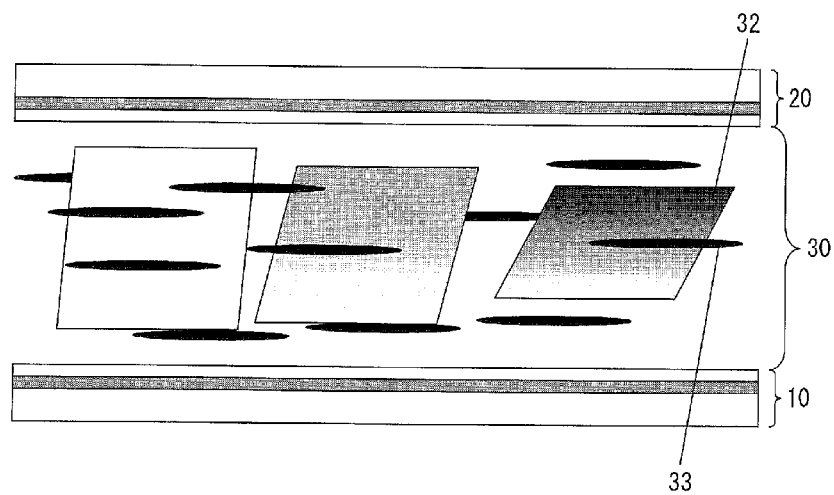
FIG. 5 is a view of the orientation of liquid crystal molecules and shape-anisotropic members in a display panel according to a comparison example.

FIG. 5 is a comparison example showing orientation control of the shape-anisotropic members 32 when an alignment film is provided so that the liquid crystal molecules are parallel to the surface of the substrates when no voltage is being applied to the light modulation layer.

As shown in FIG. 5, when the liquid crystal molecules are parallel to the surface of the substrates, the shape-anisotropic members 32 are supported in one direction (one axis) by the liquid crystal molecules 33 on one surface and the liquid crystal molecules 33 on the other surface. Therefore, the orientation of the shape-anisotropic members does not depend on the liquid crystal molecules, and it is not possible to perform accurate display control.

Accordingly, it is preferable that the liquid crystal molecules 33 be arranged so as to twist from the substrate 10 towards the substrate 20 when no voltage is being applied to the light modulation layer 30, as in the display panel 2 shown in Embodiment 1.

In other words, it is preferable that, when no voltage is being applied to the light modulation layer 30, the respective long axes of the liquid crystal molecules 33 that are separated at a constant distance from each other in the perpendicular line direction of the surface of the substrate 10 and the substrate 20 are different from each other.

This makes it possible for the liquid crystal molecules 33 to hold the shape-anisotropic members 32 and for the orientation of the shape-anisotropic members 32 to be determined by the liquid crystal molecules 33.

<Embodiment 2>

Figure 7:
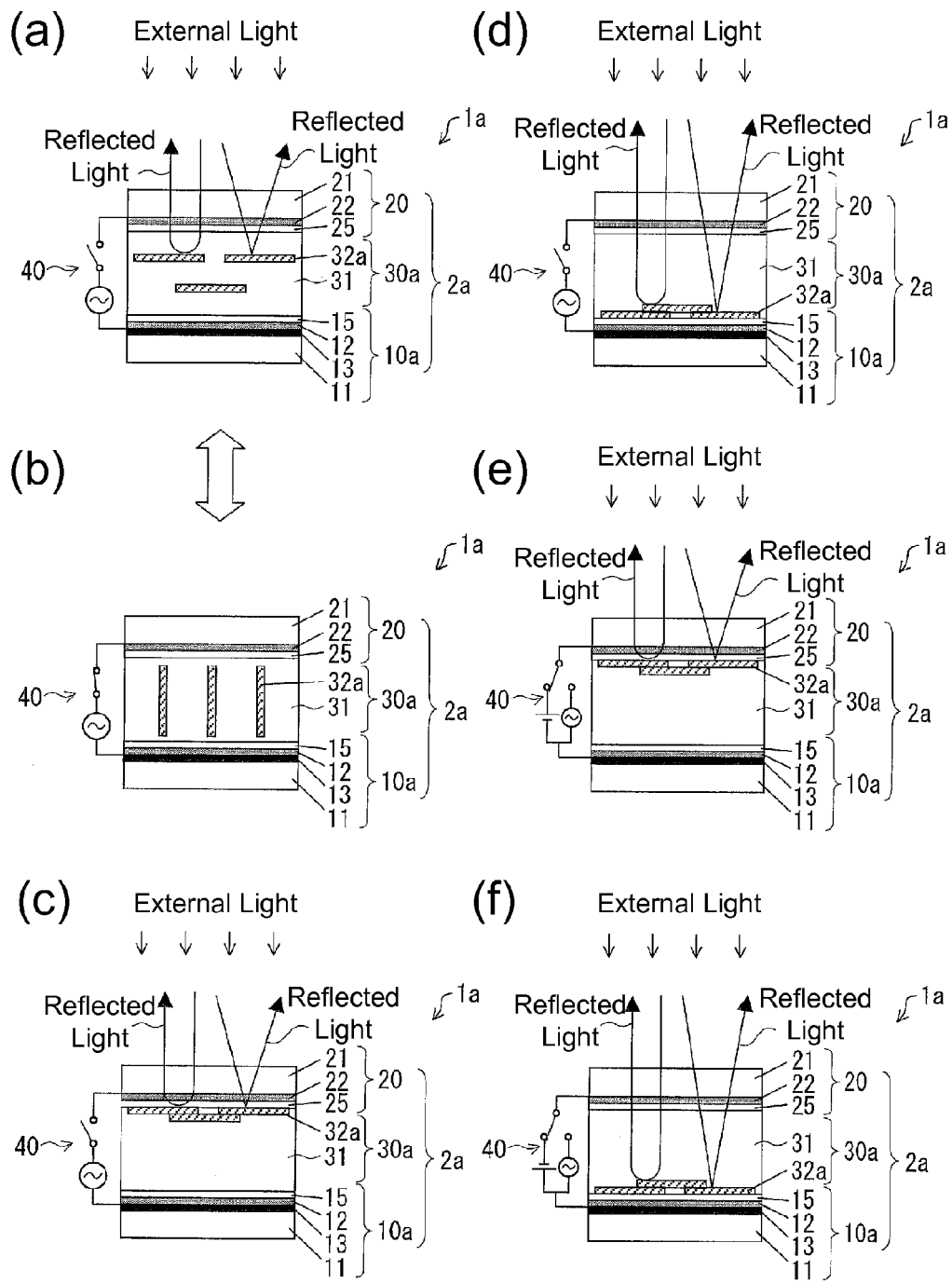
FIG. 7(a) is a view showing the progression of light in the configuration in FIG. 6(a)
FIG. 7(b) is a view showing the progression of light in the configuration in FIG. 6(b), FIGS. 7(c) and 7(d) are views showing the progression of light when flakes are attached to one substrate.
FIGS. 7(e) and 7(f) are views showing the progression of light when the electrodes are charged using a direct current power source to attach the flakes to one substrate.
Figure 8:
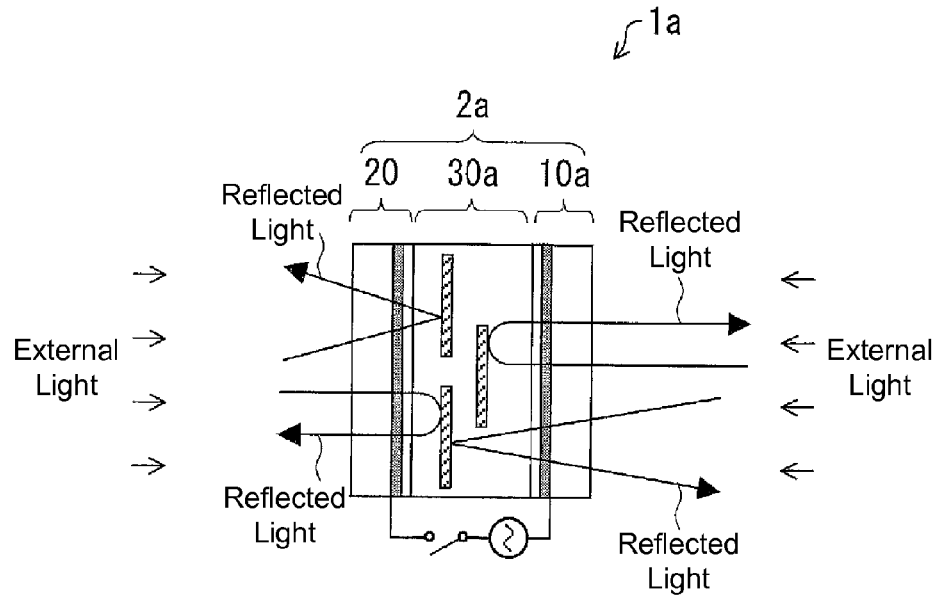
Figure 8:
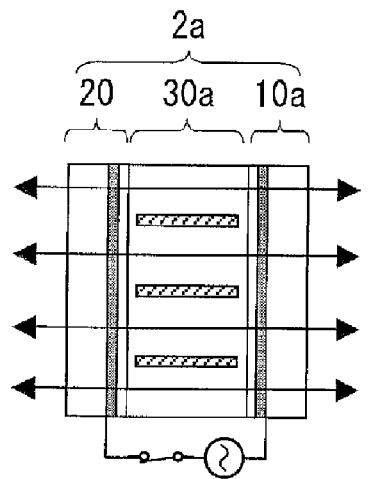

Another embodiment directed to a display device of the present invention will be explained below with reference to FIGS. 6 to 8.

For convenience of explanation, members having the same function as described in the drawings for Embodiment 1 are given the same reference characters, and an explanation thereof will not be repeated.

Figure 6:
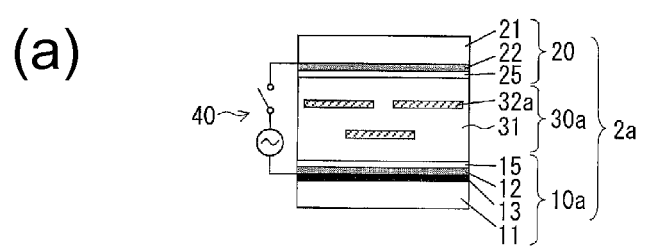
FIGS. 6(a) and 6(b) are a cross-sectional view of a schematic configuration of a display device according to Embodiment 2.
Figure 6:
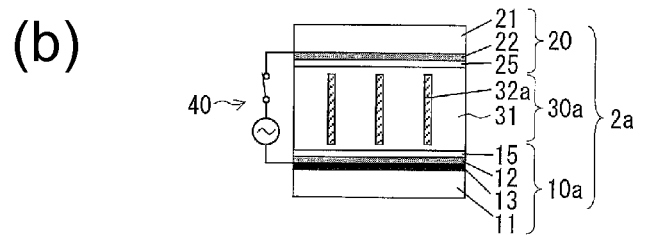

FIGS. 6(*a*) and 6(*b*) are cross-sectional views showing a schematic configuration of a display device 1*a* according to Embodiment 2. The display device 1*a* has a display panel 2*a* and driving circuits (not shown), and is a reflective-type that performs display by reflecting external light that is incident on the display panel 2*a*.

The display panel 2*a* includes a pair of substrates 10*a* and 20 arranged facing each other, and a light modulation layer 30*a* disposed between this pair of substrates 10*a* and 20. The substrate 10*a* (first substrate) is disposed on the rear side of the display panel 2*a* and the substrate 20 (second substrate) is disposed on the display surface side (viewer's side). The display panel 2*a* has a large number of pixels arranged in rows and columns.

The substrates 10*a* and 20 each include an insulating substrate constituted of a transparent glass substrate, for example, and have electrodes 12 and 22.

The substrate 10*a* is an active matrix substrate. Specifically, the substrate 10*a* has, on the glass substrate 11, various types of signal wiring lines (scan signal lines, data signal lines, and the like), thin-film transistors ("TFTs"), and an insulating film. A light absorbing layer 13 and the electrode 12 are arranged on top of these. The light absorbing layer 13 has characteristics that absorb light of at least a certain range of wavelengths of the light that enters therein. The light absorbing layer 13 may be colored, and is black, for example.

The substrate 20 has the electrode 22 (common electrode) disposed on a glass substrate 21.

The light modulation layer 30*a* is disposed between the electrodes 12 and 22 and includes a liquid crystal material 31, and a plurality of shape-anisotropic members 32*a* included in this liquid crystal material 31. When a voltage is applied by a power source 40 connected to the electrodes 12 and 22, the light modulation layer 30a changes the reflectance of light (external light) that enters therein in accordance with changes in the applied voltage.

The shape-anisotropic members 32a are response members that rotate or change shape in accordance with the direction of the electric field. In terms of display characteristics, the area of the projection of the shape-anisotropic members 32a (the projected area for the substrates 10a and 20) as seen from a view normal to the substrates 10a and 20 changes in accordance with changes in the applied voltage. It is preferable that the projected area ratio (maximum projected area: smallest projected area) be at least 2:1.

The shape-anisotropic members 32a may have a positive or negative charge in the liquid crystal material 31. Specifically, the shape-anisotropic members can be members in which it is possible for electrodes, the liquid crystal material 31, or the like to interact with electrons, or members that have been modified with an ionic silane coupling agent or the like, for example.

The shape-anisotropic members 32a can be a flake shape, a columnar shape, an ellipsoid shape, or the like, for example. The shape-anisotropic members 32a can have characteristics that reflect visible light and can be made of a metal such as aluminum, for example. The shape-anisotropic members 32a may be colored. The other characteristics of the shape-anisotropic members 32a are the same as the shape-anisotropic members 32 shown in Embodiment 1.

Next, a method of controlling the reflectance of light using the light modulation layer 30a will be described in detail. Unless specific otherwise, a case will be explained in which aluminum (Al) flakes are used for the shape-anisotropic members 32a.

If a high voltage (high effective voltage) is applied to the light modulation layer 30a, then as shown in FIG. 7(b), the long axes of the flakes rotate so as to become parallel with the lines of electric force, due to forces explained by the dielectrophoretic phenomenon, Coulomb's force, and electrical energy, and due to forces that make the interface energy with the liquid crystal molecules 33 very small. In other words, the flakes are oriented (vertically oriented) in a direction in which the long axes thereof are perpendicular to the substrates 10a and 20. Therefore, external light that enters the light modulation layer 30a passes through the light modulation layer 30a and is absorbed by the light absorbing layer 13. This allows the viewer to view a black color of the light absorbing layer 13 (black display).

On the other hand, when a voltage is not being applied to the light modulation layer 30a, the liquid crystal molecules 33 are oriented in the orientation direction of alignment films 15 and 25. In the present embodiment, the liquid crystal molecules 33 are twisted at a 180° angle between the substrates 10a and 20. The flakes are held by the liquid crystal molecules 33 due to the forces making the interface energy with the liquid crystal molecules 33 very small.

In other words, as shown in FIG. 7(a), the flakes are oriented (horizontally oriented) such that the long axes thereof become parallel to the substrates 10a and 20. Therefore, the external light that enters the light modulation layer 30a is reflected by the flakes. This makes it possible to realize a reflective display.

Thus, if the colored layer (light absorbing layer 13) is disposed on the rear side of the display panel 2a, the reflective color of the flakes can be viewed when the flakes are horizontally oriented, and the colored layer can be viewed when the flakes are vertically oriented. When the colored layer is black and the flakes are specks of metal, for example, then light will reflect off the specks of metal when the flakes are horizontally oriented, and a black display will be achieved when the flakes are vertically oriented. Furthermore, it is possible to scatter reflected light and to achieve a white display by forming the metal specks at an average diameter of 20 μm or below, forming the surfaces of the flakes so as to have recesses and protrusions that have light scattering characteristics, and forming the contours of the flakes to have acute recesses and protrusions.

When using flakes that have been given a charge as the shape-anisotropic members 32a, the flakes can be oriented so as to attach to the substrate 10a or the substrate 20 by charging the electrode 22 or the electrode 12 to be the opposite polarity of the flakes in a state in which the flakes are horizontally oriented.

When the flakes have a negative charge, the flakes can be made to attach to the substrate 20 by giving the electrode 22 a positive charge, as shown in FIG. 7(c), for example.

Thus, in a configuration in which the flakes are oriented towards the substrate 20 on the viewer's side, when the amount of flakes included in the liquid crystal material 31 is high, and when the amount exceeds what is necessary for covering the substrate 20 surface with one layer of flakes when the flakes are horizontally oriented, the viewer will see a single flat surface (plane reflective surface) due to the reflective surface of the flakes; therefore, it is possible to achieve a display with a high specularity (mirror reflectance).

When the flakes have a negative charge, the flakes can be made to attach to the substrate 10a by giving the electrode 12 a positive charge, as shown in FIG. 7(d), for example.

Thus, in a configuration in which the flakes are oriented towards the substrate 10a on the rear side, the viewer will see an accumulation of the flakes; therefore, it is possible to obtain a display with good scattering characteristics by the plurality of flakes having surfaces with recesses and protrusions.

A method of charging the electrodes 12 and 22 includes applying a direct voltage to the electrodes 12 and 22.

FIGS. 7(e) and 7(f) are the display device 1a when a DC power supply has been disposed in parallel with an AC power supply. The display device 1a shown in FIGS. 7(e) and 7(f) can switch between direct current and alternate current being applied to the electrodes 12 and 22 by switching.

As shown in FIG. 7(e), the flakes can be made to attach to the substrate 20 by applying DC voltage to the electrodes 12 and 22 and giving the electrode 22 a positive charge in a state in which the flakes are horizontally oriented.

As shown in FIG. 7(f), the flakes can be made to attach to the substrate 10a by applying DC voltage to the electrodes 12 and 22 and giving the electrode 12 a positive charge in a state in which the flakes are horizontally oriented.

In FIGS. 7(e) and 7(f), the switch is not connected to either the AC power supply or the DC power supply, thereby making it possible for the flakes to be horizontally oriented such that the flakes are dispersed in a substantially uniform manner in the liquid crystal material 31, in a similar manner to the orientation to the flakes in FIG. 7(a).

The polarity of the flakes may be positive. In this case, the substrate to which the flakes attach will be the opposite of those shown in FIGS. 7(e) and 7(f).

In the display device 1a shown in FIGS. 7(e) and 7(f), a configuration may be used in which the polarity of the DC voltage is switched by the switch. This makes it possible to switch the polarity of the electrodes 12 and 22.

Thus, when the flakes are horizontally oriented, if using a configuration in which the polarity of the electrodes 12 and 22 is switched, then by providing the black colored light absorbing layer 13 on the rear side, for example, it is possible to achieve the display device 1a that can switch among black (vertical orientation [FIG. 7(b)]), white (horizontal orientation [FIG. 7(d) or FIG. 7(f)]), and mirror reflectance (horizontal orientation [FIG. 7(c)] or [FIG. 7(e)]).

When providing a color filter (not shown) on the substrate 20, if a configuration is used in which the flakes are oriented to the substrate 20 on the viewer's side, as shown in FIGS. 7(c) and 7(e), then it is possible to suppress disparity from occurring between the light modulation layer 30a and the color filter. Therefore, it is possible to achieve a high-quality color display.

Thus, in the display device 1a according to the present embodiment, the flakes (the shape-anisotropic members 32a) can be oriented towards the substrate 10a or the substrate 20 by the polarity of the DC voltage being applied to the light modulation layer 30a being switched during reflective display (horizontal orientation).

An example of a method in which DC voltage is applied to the electrodes 12 and 22 to charge these electrodes 12 and 22 was described, but the present invention is not limited to this, and any well-known method of charging the electrodes 12 and 22 can be used.

In the display device 1a, when the light absorbing layer 13 is a transparent layer or when the light absorbing layer 13 is omitted, the external light that has entered the light modulation layer 30a can be reflected by the flakes at the rear side (substrate 10a side) as shown in FIGS. 8(a) and 8(b), and thus, it is possible to have a reflective display. When the flakes are vertically oriented, the viewer can see the side opposite to the viewer through the display panel 2a; therefore, it is possible to realize a so-called see-through display panel. Such a display device 1a is suitable for store windows, for example.

The display device 1a may have a configuration in which a reflective layer that specularly reflects or scatters light is disposed on the rear side of the display panel 2a instead of the light absorbing layer 13, the flakes are colored members, and colored display is performed by the flakes during horizontal orientation and reflective display is performed by the reflective layer during vertical orientation.

The display device 1a according to the present embodiment may also be installed on the non-display surface of a mobile phone device or the like (the body surface and the like that is not normally used as an image display surface), for example. In such a mobile phone device, if the electrodes 12 and 22 of the display device 1a are transparent electrodes, then the body color of the mobile phone device can be displayed on the non-display surface by the flakes being vertically oriented, whereas the colored flakes can be displayed on the non-display surface or external light can be reflected by the flakes being horizontally oriented. The flakes can also be horizontally oriented and used as a mirror (mirror reflectance). In such a display device 1a, it is possible to form the electrodes 12 and 22 with segment electrodes or uniformly planar electrodes, which allows for the circuit configuration to be simplified.

The display device 1a according to the present embodiment can also be applied to a switching panel for 2D/3D display, for example. Specifically, the display device 1a, which is the switching panel, is installed on the front surface of an ordinary liquid crystal display panel. The display device 1a has black-colored flakes arranged in stripes, and during 2D display the flakes are vertically oriented and it is possible to see images displayed on the entire surface of the liquid crystal display panel, and during 3D display the flakes are horizontally oriented to form stripes, which displays a left image and a right image on the liquid crystal display panel to form a three-dimensional image. This makes it possible to realize a liquid crystal display device that can switch between 2D display and 3D display. The above-mentioned configuration can also be applied to multi-view liquid crystal display devices such as a dual-view model.

<Embodiment 3>

Figure 9:
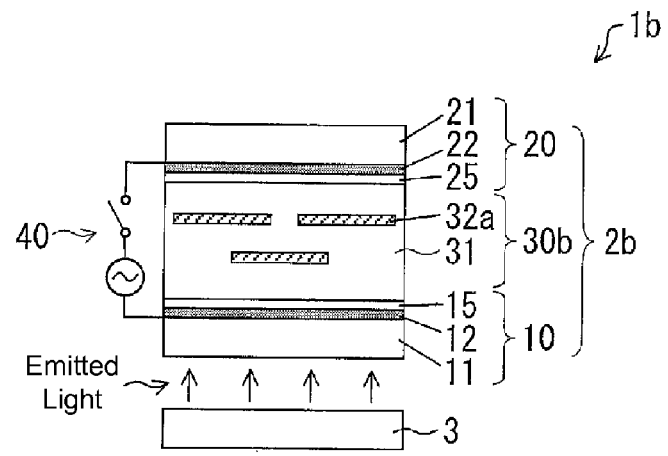
FIGS. 9(a) and 9(b) are a cross-sectional view of a schematic configuration of a display device according to Embodiment 3.
Figure 9:
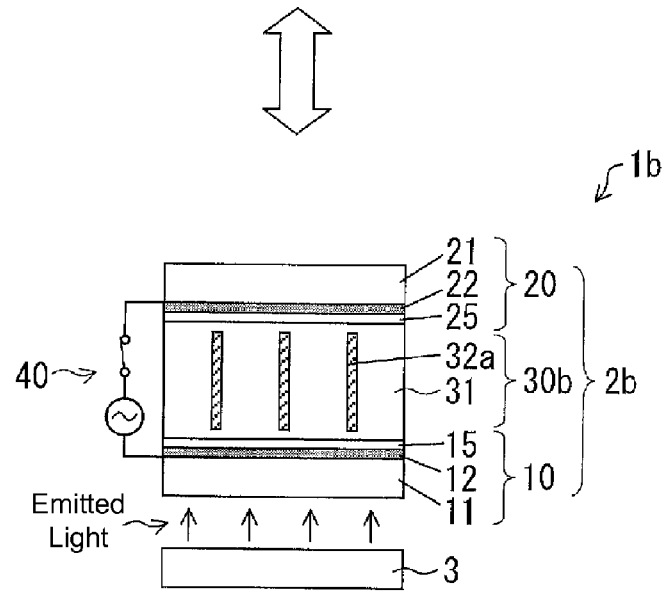

Another embodiment directed to a display device of the present invention will be explained below with reference to FIG. 9.

For convenience of explanation, members having the same function as described in the drawings for Embodiment 1 are given the same reference characters, and an explanation thereof will not be repeated.

FIGS. 9(a) and 9(b) are cross-sectional views showing a schematic configuration of a display device 1b according to Embodiment 3. The display device 1b includes a display panel 2b, a backlight 3 that illuminates the display panel 2b, and driving circuits (not shown). This display device is a transflective-type, which performs display by allowing light from the backlight 3 to pass through and by reflecting external light.

The display panel 2b includes a pair of substrates 10 and 20 arranged facing each other, and a light modulation layer 30b disposed between this pair of substrates 10 and 20. The substrate 10 (first substrate) is disposed on the rear side of the display panel 2b and the substrate 20 (second substrate) is disposed on the display surface side (viewer's side). The display panel 2b has a large number of pixels arranged in rows and columns.

The substrates 10 and 20 each include an insulating substrate constituted of a transparent glass substrate, for example, and have electrodes 12 and 22. The configuration of the substrates 10 and 20 is the same as shown in Embodiment 1.

The light modulation layer 30b is disposed between the electrodes 12 and 22 and includes a liquid crystal material 31, and a plurality of shape-anisotropic members 32a included in this liquid crystal material 31. Voltage is applied to the light modulation layer 30b by a power source 40 connected to the electrodes 12 and 22, and the light modulation layer 30b changes the transmittance of light that has entered therein from the backlight 3 and reflectance of light (external light) that has entered the light modulation layer 30b from outside in accordance with the change in applied voltage.

The configuration of the shape-anisotropic members 32a is the same as shown in Embodiment 2. In other words, the shape-anisotropic members 32a are response members that rotate or change shape in accordance with the direction of the electric field, have a positive or negative charge in the liquid crystal material 31, and have characteristics that reflect visible light. The shape-anisotropic members 32a will be described as aluminum (Al) flakes.

With this configuration, if a high voltage is applied to the light modulation layer 30b, then as shown in FIG. 9(b), the long axes of the flakes rotate so as to become parallel with the lines of electric force, due to forces explained by the dielectrophoretic phenomenon, Coulomb's force, and electrical energy, and due to forces that make the interface energy with the liquid crystal molecules 33 very small.

In other words, the long axes of the flakes are oriented (vertically oriented) so as to be perpendicular to the substrates 10 and 20. Due to this, light that enters the light modulation layer 30b from the backlight 3 passes therethrough and exits to the viewer's side. Transmissive display is achieved in this manner.

On the other hand, if a low voltage is applied (or if no voltage is applied) to the light modulation layer 30b, then the flakes will be held by the liquid crystal molecules 33 due to forces making the interface energy with the liquid crystal molecules 33 very small.

In other words, as shown in FIG. 9(a), the flakes are oriented (horizontally oriented) such that the long axes thereof become parallel to the substrates 10 and 20. Therefore, the external light that enters the light modulation layer 30b is reflected by the flakes. Reflective display is achieved in this manner.

The transflective display device 1b according to Embodiment 3 is not limited to the configuration above, and may have the configuration below instead. The modification example below is referred to as a display device 1c.

The display device 1c uses light from the backlight to perform transmissive display (transmissive mode) in relatively dark places, such as indoors, and uses external light to perform reflective display (reflective mode) when in relative bright areas, such as outdoors. This makes it possible to realize a display with a high contrast ratio regardless of ambient brightness levels. In other words, the display device 1c can perform display in all illumination levels (light environments) regardless of being indoors or outdoors; thus, this display device is suitable for mobile devices such as mobile phones, PDAs, digital cameras, and the like.

In the display device 1c, a reflective display section used for reflective mode and a transmissive display section used for transmissive mode both are formed in each pixel in a display panel 2c. On a substrate 10c of the display panel 2c, a transparent electrode (pixel electrode) made of ITO or the like is formed in the transmissive display section, and a reflective electrode (pixel electrode) made of aluminum or the like is formed in the reflective display section. A common electrode made of ITO or the like is formed facing these electrodes on a substrate 20c. Shape-anisotropic members 32c are disposed in a light modulation layer 30c, and these shape-anisotropic members 32c are made of a material that does not reflective visible light.

The display device 1c has sensors that detect ambient brightness levels and can switch between transmissive display mode and reflective display mode depending on these ambient brightness levels.

With this configuration of the display device 1c, it is possible to turn off the backlight during reflective display mode, which can reduce power consumption.

As described above, the display devices 1b and 1c perform display by switching between reflective display (reflective display mode), which has high reflectance, and transmissive display (transmissive display mode), which has high transmittance.

<Embodiment 4>

Figure 10:
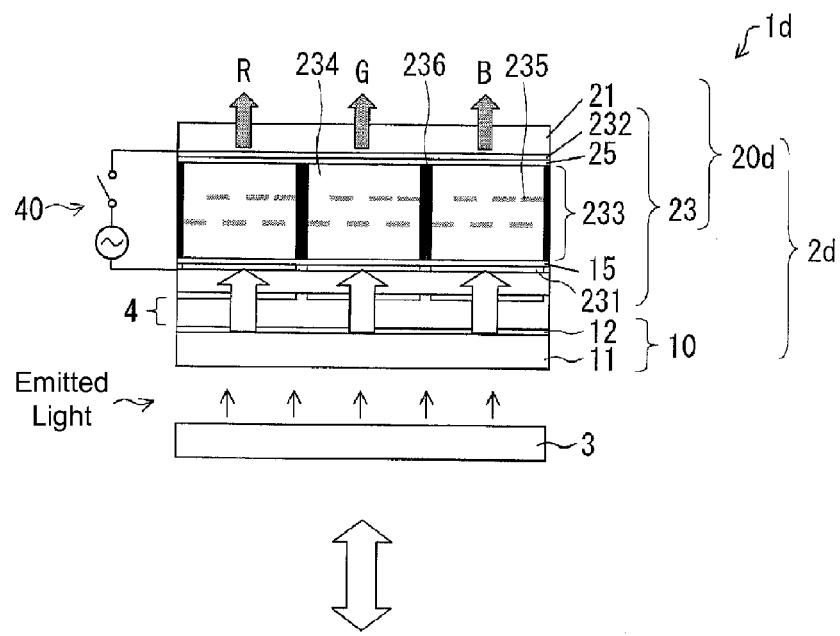
FIGS. 10(a) and 10(b) are cross-sectional views of a schematic configuration of a display device according to Embodiment 4.
Figure 10:
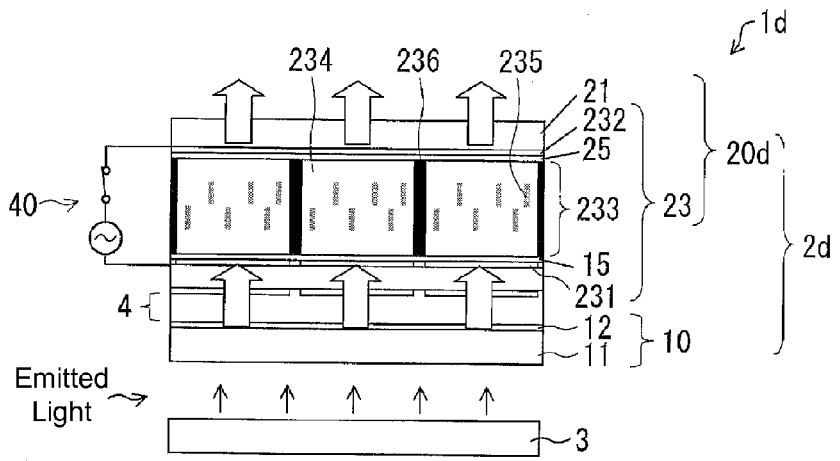

Another embodiment directed to a display device of the present invention will be explained below with reference to FIG. 10.

For convenience of explanation, members having the same function as described in the drawings for Embodiment 1 are given the same reference characters, and an explanation thereof will not be repeated.

FIGS. 10(a) and 10(b) are cross-sectional views showing a schematic configuration of a display device 1d according to Embodiment 4. The display device 1d has a display panel 2d, a backlight 3 that illuminates the display panel 2d, and driving circuits (not shown). The display device performs color display.

The display panel 2d has a pair of substrates 10 and 20d arranged facing each other and an information display light modulation layer 4 disposed between this pair of substrates 10 and 20d. The substrate 10 (first substrate) is disposed on the rear side of the display panel 2d, and the substrate 20d is disposed on the display surface side (viewer's side). The display panel 2d has a large number of pixels arranged in rows and columns.

The substrate 20d has a glass substrate 21 (second substrate) and a color filter 23. The color filter 23 includes an electrode 231 (first electrode) in each of the pixels, a second electrode 232 (common electrode, second electrode) facing the electrodes 231, and a light modulation layer 233 disposed between these electrodes 231 and 232. The electrodes 231 may be formed in a uniformly planar shape that is shared among all pixels. The light modulation layer 233 includes liquid crystal material 234, a plurality of shape-anisotropic members 235 in this liquid crystal material 234, and ribs 236 for partitioning the areas corresponding to the pixels.

Flakes that are a transparent resin to which colored dyes or pigments have been added, such as red (R), green (G), and (blue) B can be used as the shape-anisotropic members 235. These flakes are partitioned by the stripe-shaped ribs 236 according to color.

To manufacture the shape-anisotropic members, it is possible to use a method such as coloring compounds of the flakes and the liquid crystal material through injection, for example. The different colored areas are partitioned by the ribs 236 so as to correspond to the respective pixels. The information display light modulation layer 4 may have the same configuration as the light modulation layer in Embodiments 1 to 3, or may be a normal liquid crystal layer.

In the above-mentioned configuration, when performing color display, the flakes are horizontally oriented and the light that enters the color filter 23 passes through the flakes of the corresponding colors. On the other hand, when performing black and white display, the flakes are vertically oriented, and the light that enters the color filter 23 is made to reach the viewer directly. In this manner, when transmissive display is performed, for example, color display can be performed, and when displaying black and white contents such as a digital book, it is possible to suppress light loss caused by the color filter, which makes it possible to reduce the power consumption of the backlight. When performing reflective display, color display can be performed, and it is possible to have a display that takes into account the brightness level by becoming a black and white display in dark environments where visibility is poor.

Thus, with this configuration, it is possible to achieve a display device that can switch between color display and black and white display.

The color filter 23 is not limited to the above-mentioned configuration, and at least a portion of a red colored shape-anisotropic member, a green colored shape-anisotropic member, a blue colored shape-anisotropic member, a cyan (C) colored shape-anisotropic member, a magenta (M) colored shape-anisotropic member, or a yellow (Y) colored shape-anisotropic member may be used. In addition, the color filter 23 may have areas that do not include any shape-anisotropic members. Namely, in consideration of the color reproduction ranges of display images, it is preferable that the plurality of shape-anisotropic members are made of a transparent resin, and that the configuration include at least red (R) colored shape-anisotropic members, green (G) colored shape-anisotropic members, and blue (B) colored shape-anisotropic members.

<Embodiment 5>

Figure 11:
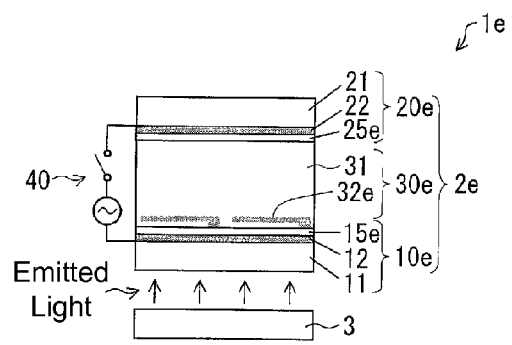
FIGS. 11(a) and 11(b) are cross-sectional views of a schematic configuration of a display device according to Embodiment 5.
Figure 11:
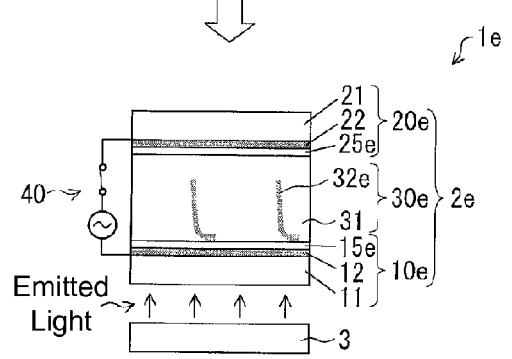

Another embodiment directed to a display device of the present invention will be explained below with reference to FIGS. 11 to 13.

For convenience of explanation, members having the same function as described in the drawings for Embodiment 1 are given the same reference characters, and an explanation thereof will not be repeated.

The shape-anisotropic members are not limited to freely rotating in the liquid crystal material of the light modulation layer, and a portion of the shape-anisotropic members be attached to a substrate 10 or a substrate 20. FIGS. 11(a) and 11(b) show ends of flakes, which are shape-anisotropic members 32e, attached to the substrate 10.

In a display panel 2e, a high voltage is applied to a light modulation layer 30e, and this causes the flakes to transform as shown in FIG. 11(b) and to be in a light transmissive state. On the other hand, applying a low voltage (or applying no voltage) causes the flakes to return to their original form as shown in FIG. 11(a) and to be a light-shielding state.

Another configuration in which one edge of the respective shape-anisotropic members 32e (flakes, for examples) are secured by a string, wire, or the like, and the flakes rotate along an axis with the secured end at the center thereof may also be used, for example.

Figure 12:
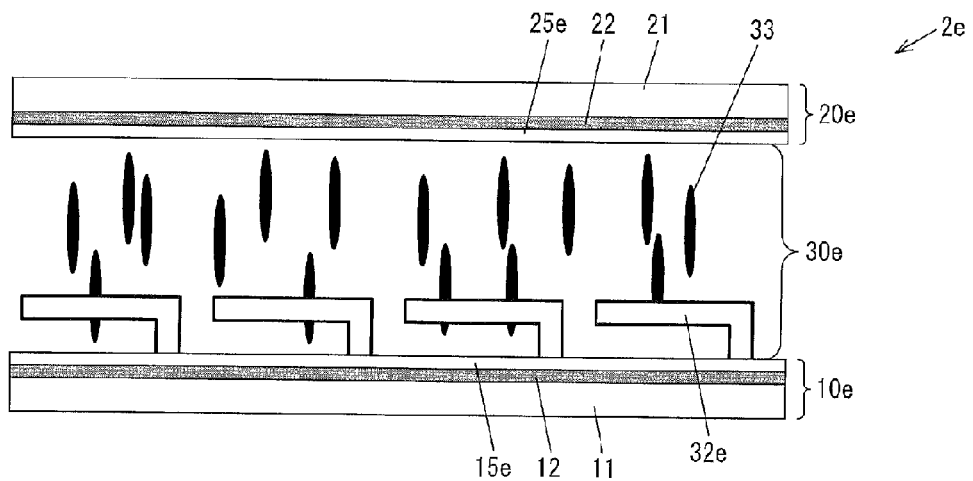
FIG. 12 is a view of the orientation of the liquid crystal molecules and shape-anisotropic members in FIG. 11(a).
Figure 13:
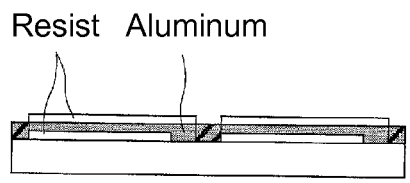
FIGS. 13(a) and 13(b) are views for explaining a method of manufacturing a display panel in which a portion of the flakes are attached to a substrate.
Figure 13:

As shown in FIG. 12, substrates 10e and 20e and the flakes may undergo a perpendicular orientation treatment. Namely, alignment films 15e and 25e disposed on the respective substrates 10e and 20e may be disposed such that the long axis direction of liquid crystal molecules 33 becomes perpendicular to the surfaces of the substrates when no voltage is being applied to the light modulation layer 30e. "Perpendicular" here does not have to be strictly perpendicular, and may be substantially perpendicular instead.

A vertical alignment film such a polyimide film having an alkyl group or fluorine-containing group can be deposited by spin coating, dip coating, or the like, for example.

When using P-type liquid crystal for the liquid crystal material 31, the liquid crystal molecules 33 will not move even if voltage is applied, and the long axis direction thereof will remain perpendicular to the surfaces of the substrates, but will be vertically oriented due to forces explained by the dielectrophoretic phenomenon, Coulomb's force, and electrical energy. If voltage is lowered (or if no voltage is being applied), then the liquid crystal molecules 33 are oriented perpendicularly to the surface of the flakes, and thus the flakes are horizontally oriented.

When using N-type liquid crystal as the liquid crystal material 31, the liquid crystal molecules 33 approach a homogeneous orientation due to applied voltage, which causes the restraining force that horizontally orients the flakes to disappear, thus making the flakes become vertically oriented.

As described above, even if P-type liquid crystal or N-type liquid crystal is used as the liquid crystal material, it is possible to control the orientation of the flakes in accordance with the voltage applied to the light modulation layer 30e and to control the light transmittance of the light modulation layer 30e. This makes it possible to perform intermediate grade display control.

Next, one example of a method of manufacturing a display panel that has a portion of the flakes attached to a substrate will be described using FIG. 13.

First, a resist layer that has been patterned using a normal photolithography process is formed on the substrate 10 in accordance with the size of the flakes. Next, vapor deposition or the like is used to form the aluminum layer, for example, and as shown in FIG. 13(a), a resist layer is patterned that is larger than the above-mentioned resist in a size equivalent to the aluminum that will be attached to the substrate. Next, the shaded striped area of aluminum in FIG. 13(a) of this composite layer is removed by an etchant of phosphoric acid, nitric acid, or acetic acid, for example. By removing the resist through NMP (N-pyrrolidone), for example, it is possible to obtain an aluminum material in which a portion of the aluminum is attached to the substrate. By bonding this substrate 10 with the opposite substrate 20 with the liquid crystal material therebetween while ensuring a substrate gap distance equal to the space shown in FIG. 13(b) or the like, for example, it is possible to manufacture the display panel 2 in which a portion of the flakes have been bonded to the substrate (see FIG. 11(a)).

The display device in the respective embodiments is not limited to the above-mentioned configurations, and the below configuration can also be used.

(Cell Thickness)

A shown in FIG. 1(b), for example, it is preferable that the thickness (cell thickness) of the light modulation layer be sufficient for the flakes to be vertically oriented, but the present invention is not limited to this, and the light modulation layer may have an approximate thickness at which the flakes stop at an intermediate angle (tilted orientation).

Figure 14:
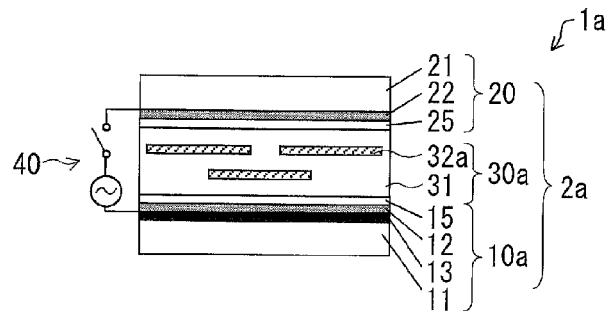
FIGS. 14(a) and 14(b) are cross-sectional views of a schematic configuration when cell thickness has been reduced in the display device according to Embodiment 2.
Figure 14:
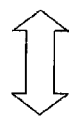
Figure 14:
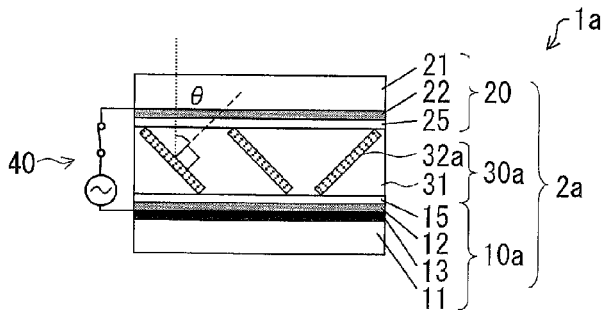

Specifically, in the reflective display device 1a according to Embodiment 2 in which the black colored light absorbing layer 13 is disposed on the rear side of the display panel 2a, for example, when a liquid crystal material 31 having a light refractive index of 1.5 is used for the light modulation layer 30a, the cell thickness is configured such that an angle θ of the direction normal to the display panel surface to the direction normal to the flake surface is at least 42 degrees, as shown in FIG. 14(b). By doing this, the light that reflects off the flakes does not directly exit at least from the substrate on the viewer's side, thus making it possible to suitably perform black display.

(Shape of Shape-Anisotropic Members)

Figure 15:
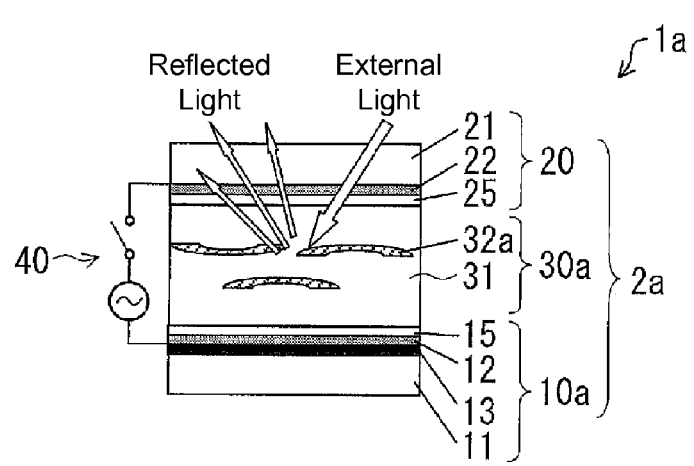
FIGS. 15(a) and 15(b) are cross-sectional views of a schematic configuration when using bowl-shaped flakes in the display device according to Embodiment 2.
Figure 15:
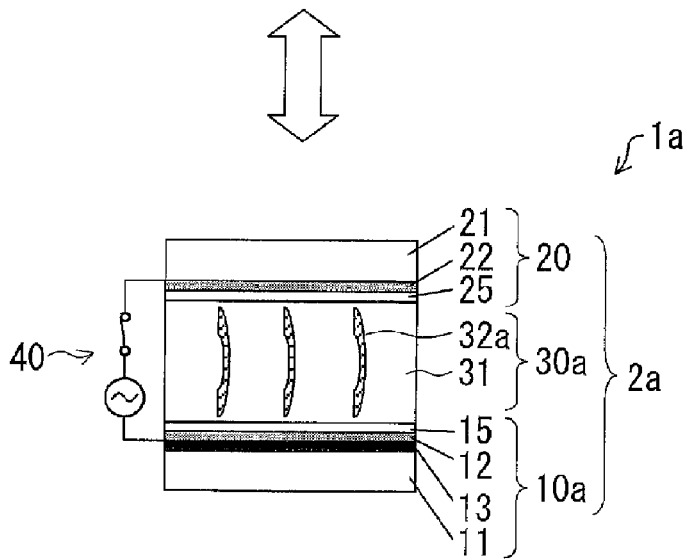

The shape-anisotropic members can be bowl-shaped flakes (having surfaces with recesses and protrusions). FIGS. 15(a) and 15(b) show bowl-shaped flakes in the reflective display device 1a according to Embodiment 2.

With this configuration, light scattering characteristics can be improved as compared to flat (plane) flakes (see FIG. 6).

(Shape of Shape-Anisotropic Members 2)

Figure 16:
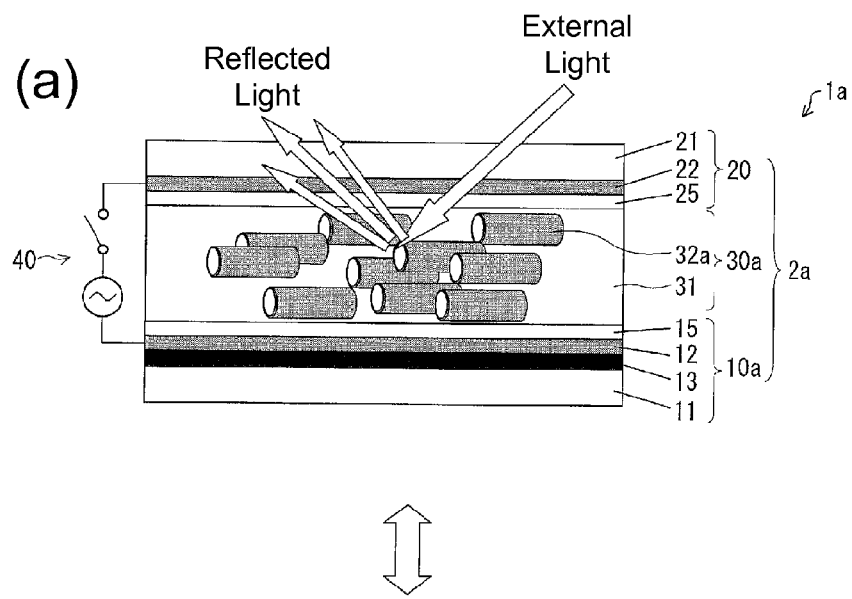
FIGS. 16(a) and 16(b) are cross-sectional views of a schematic configuration when using fiber-shaped flakes in the display device according to Embodiment 2.
Figure 16:
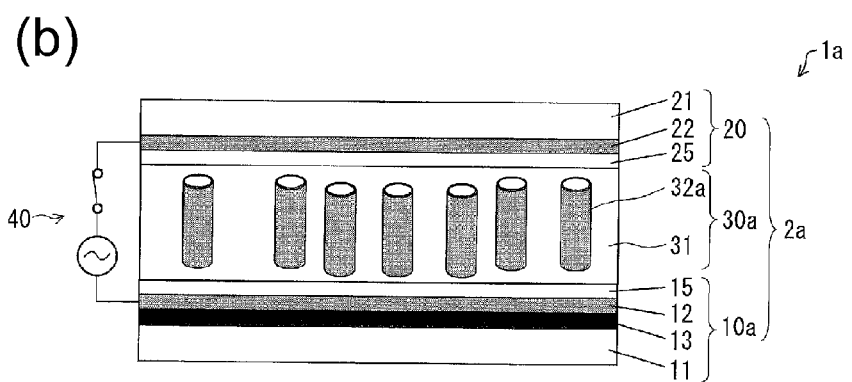
Figure 17:
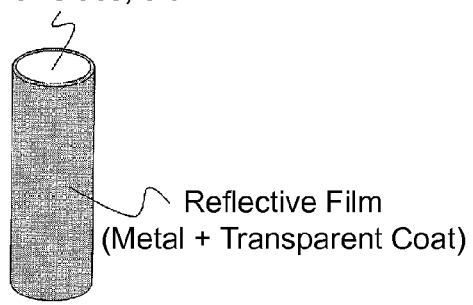
FIG. 17 is a perspective view of a schematic configuration of a shape-anisotropic member in which a reflective film is formed on transparent columnar glass.

The shape-anisotropic members may have a fiber-like shape. FIGS. 16(a) and 16(b) show fiber-like shape-anisotropic members in the reflective display device 1a according to Embodiment 2. The fiber-like shape-anisotropic members (referred to as fibers) can be a configuration in which a reflective film (metal or metal and a resin coat) is formed on transparent columnar glass, as shown in FIG. 17, for example.

FIG. 16(a) shows a state in which the fibers are horizontally oriented to perform reflective display (white display) when a low voltage (or when no voltage) is being applied to the light modulation layer 30a. When horizontally orientated, external light is scattered and reflected by the reflective films on the fibers, thereby performing white display.

FIG. 16(b) shows a state in which the fibers are vertically oriented to perform transmissive display (black display) when a high voltage is being applied to the light modulation layer 30a. When vertically orientated, external light is reflected by the fibers and then progresses in the substrate 10a direction, thereby being absorbed by the light absorbing layer 13. This results in black display.

Figure 18:
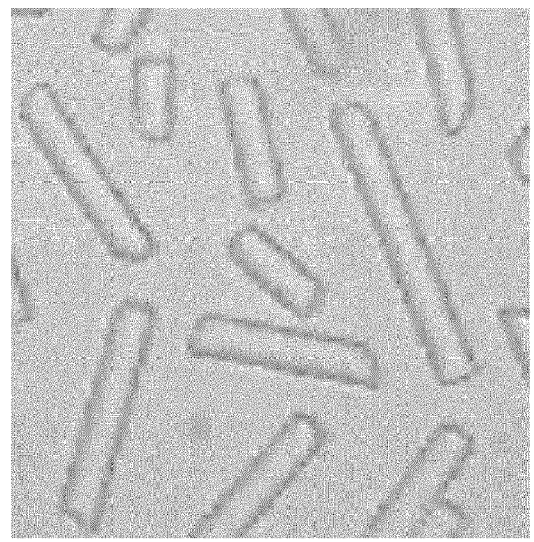
FIG. 18(a) is an image of the appearance (plan view) when glass fibers have been oriented horizontally.
FIG. 18(b) is an image of the appearance (plan view) when glass fibers have been oriented vertically.
Figure 18:
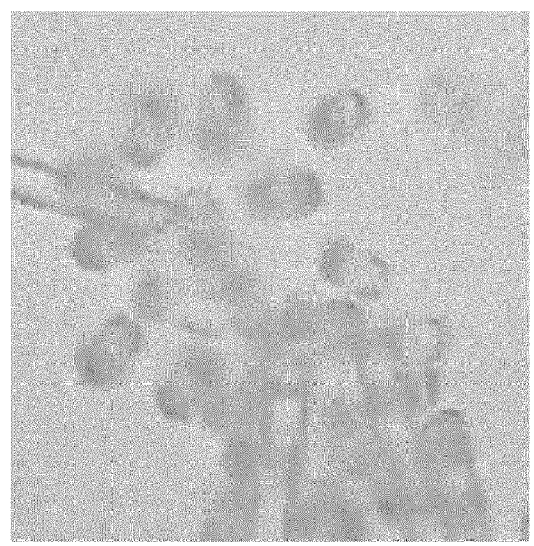

FIG. 18(a) is an image of the appearance (plan view) when the fibers are horizontally oriented, and FIG. 18(b) is an image of the appearance (plan view) when the fibers are vertically oriented. Glass fibers that are 5 μm in diameter are used for the shape-anisotropic members 32a, and the cell thickness is 79 μm. The images were taken while switching the applied voltage ON and OFF.

When the voltage was switched OFF, the glass fibers become horizontally oriented as shown in FIG. 18(a), and when the voltage was switched ON, the glass fibers become vertically oriented as shown in FIG. 18(b).

(Method of Applying Voltage)

Applying voltage to the light modulation layer is not limited to a configuration in which alternating voltage is used, and direct voltage may be used instead. When using a configuration in which alternating voltage is applied, it is possible to use a well-known inversion driving method such as a frame inversion driving method or a dot inversion driving method.

In the display device of the present invention, the orientation of the liquid crystal molecules can be controlled depending on the size of the voltage (real voltage) applied to the light modulation layer, and the orientation of the shape-anisotropic members can be controlled depending on the orientation of the liquid crystal molecules. This makes it possible to control the light transmittance of the light modulation layer.

Namely, the light transmittance is controlled in accordance with the size of the voltage applied to the light modulation layer; therefore, it is possible to perform an intermediate grade display.

(Diffuse Reflection Layer)

Figure 19:
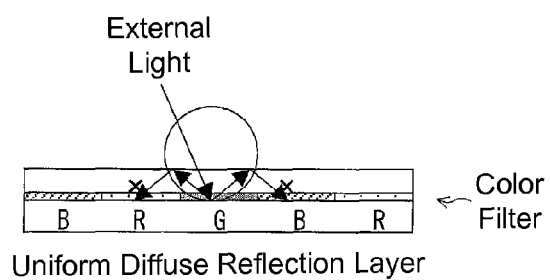
FIG. 19(a) is a view of light reflecting characteristics of a conventional color filter.
FIG. 19(b) is a view of light reflecting characteristics of a color filter of the present invention.
Figure 19:
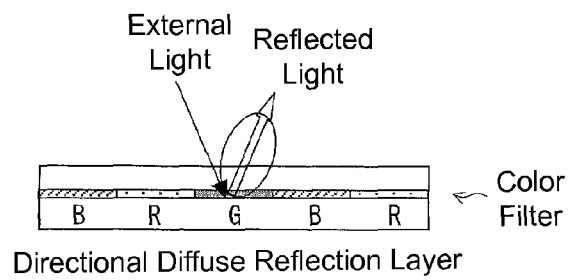
Figure 20:
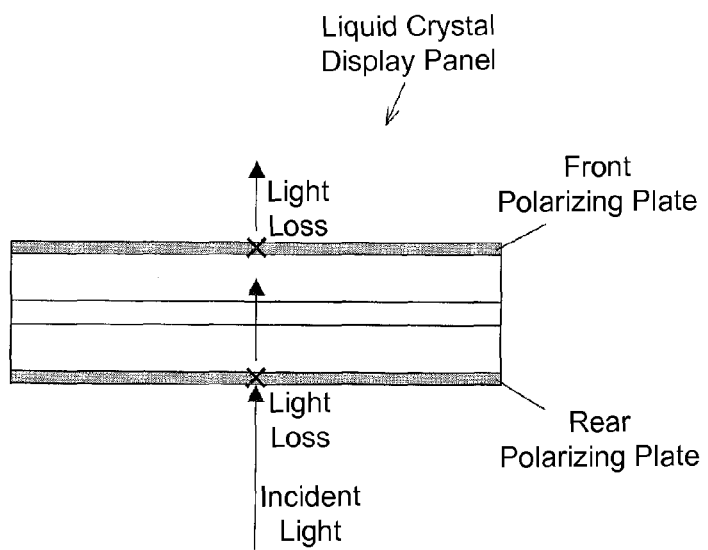
FIG. 20 is a schematic view showing the path of light passing through a conventional liquid crystal display panel.
Figure 21:
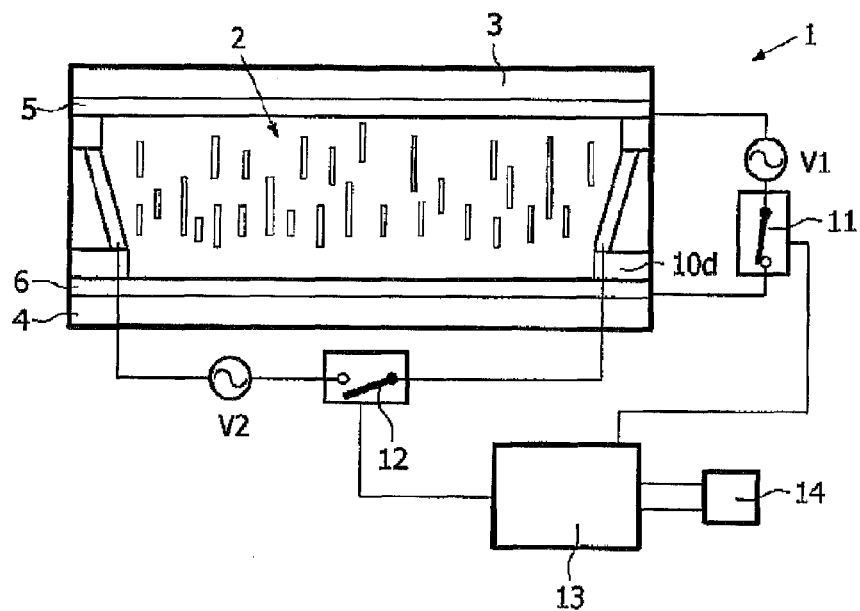
FIGS. 21(a) and 21(b) are cross-sectional views showing a schematic configuration of a transflective display in Patent Document 1.
Figure 21:
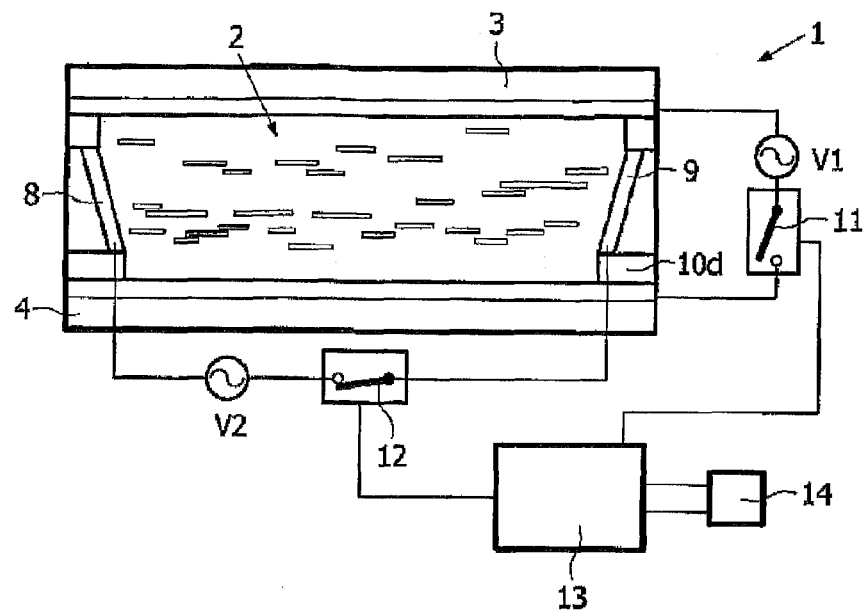
Figure 22:
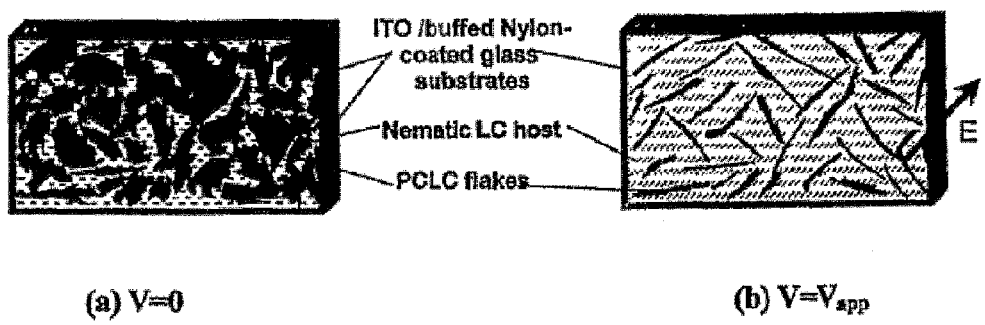
FIG. 22 is a cross-sectional view of a schematic configuration of an optical device in Patent Document 2.

In the reflective display device 1a according to Embodiment 2, the scattering characteristics of the reflected light can be controlled by the selection and concentration of the size, shape, planarity, and the like of the flakes. In fine-particle electrophoretic displays, for example, which display white by the scattering of titanium oxide and the like, such scattering is close to isotropic. When using a color filter on a display with these types of scattering characteristics to perform color display, the light that has been scattered and guided at a certain color pixel will be absorbed by the color filter of another color pixel, which results in a large loss of reflected light, as shown in FIG. 19(a). As a countermeasure, according to the display device 1a, it is possible to have a certain amount of directionality when in a scattering state, thus allowing for a high-quality color display by using the color filter, as shown in FIG. 19(b).

The present invention is not limited to the embodiments described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The present invention is applicable to a display such as a television.

DESCRIPTION OF REFERENCE CHARACTERS 1, 1a, 1b, 1c, 1d display device
2, 2a, 2b, 2c, 2d display panel
3 backlight
4 information display light modulation layer
10, 10a, 10c substrate
11 glass substrate
12 electrode
13 light absorbing layer
15, 15e, 25, 25e alignment film
20, 20c, 20d substrate
21 glass substrate
22 electrode
23 color filter
25 alignment film
30, 30a, 30b, 30c, 30e light modulation layer
31 liquid crystal material
32, 32a, 32c, 32e shape-anisotropic member
33 liquid crystal molecule

What is claimed is:

1. A display panel, comprising:
   a first substrate disposed on a rear side and a second substrate disposed on a display surface side, the first substrate and the second substrate facing each other; and
   a light modulation layer disposed between said first substrate and said second substrate, the light modulation layer controlling a transmittance of light that enters therein,
   wherein the light modulation layer comprises a plurality of shape-anisotropic members and liquid crystal material formed of liquid crystal molecules,
   wherein the first substrate and the second substrate have an alignment treatment performed on the surfaces thereof facing the light modulation layer,
   wherein said alignment treatment is performed such that, when voltage is not being applied to the light modulation layer, the liquid crystal molecules are helically twisted around an axis perpendicular to the first substrate and the second substrate from the first substrate, or such that the liquid crystal molecules become substantially perpendicular to the first substrate and the second substrate, and
   wherein changing a voltage applied to the light modulation layer changes an orientation of the liquid crystal molecules, thereby changing an area projected through the shape-anisotropic members with respect to the first substrate and the second substrate in a direction normal to the first substrate and the second substrate.

2. The display panel according to claim 1,
   wherein a chiral agent is added to the liquid crystal material.

3. The display panel according to claim 2, wherein when voltage is not being applied to the light modulation layer, the liquid crystal molecules twist at a 90° to 3600° angle towards the second substrate from the first substrate.

4. The display panel according to claim 2, wherein the shape-anisotropic members are arranged such that a long axis of the liquid crystal molecules is substantially parallel to a largest-area-surface of the respective shape-anisotropic members.

5. The display panel according to claim 2, wherein the liquid crystal molecules have a permittivity in a long axis direction that is greater than a permittivity in a direction perpendicular to the long axis direction.

6. The display panel according to claim 1,
   wherein the alignment treatment is performed such that, when voltage is not being applied to the light modulation layer, the liquid crystal molecules orient perpendicularly to the first substrate and the second substrate, and
   wherein the shape-anisotropic members are arranged such that a long axis of the liquid crystal molecules is substantially perpendicular to a largest-area-surface of the respective shape-anisotropic members.

7. The display panel according to claim 1, wherein the light modulation layer transmits an amount of light that corresponds to an amount of voltage applied to the light modulation layer.

8. The display panel according to claim 1, wherein the shape-anisotropic members are oriented such that an angle of a line perpendicular to a largest-area-surface of the shape-anisotropic member to a line perpendicular to a surface of the first substrate and the second substrate changes in accordance with an amount of voltage being applied to the light modulation layer.

9. The display panel according to claim 1, wherein the area projected through the shape-anisotropic members with respect to the first substrate and the second substrate is changed by rotating the shape-anisotropic members in accordance with an amount of voltage applied to the light modulation layer.

10. The display panel according to claim 1, wherein the area projected through the shape-anisotropic members with respect to the first substrate and the second substrate is changed by changing a shape of the shape-anisotropic members in accordance with an amount of voltage applied to the light modulation layer.

11. The display panel according to claim 9, wherein a portion of each of the shape-anisotropic members is attached to the first substrate or the second substrate.

12. The display panel according to claim 1, wherein the shape-anisotropic members are made of a metal, a semiconductor, a dielectric material, a dielectric multilayer film, or a cholesteric resin.

13. The display panel according to claim 1, wherein the shape-anisotropic members are made of a metal and reflect light that is incident thereon.

14. The display panel according to claim 1 any, wherein the shape-anisotropic members are colored.

15. The display panel according to claim 1,
wherein the light modulation layer functions as a color filter, and
wherein the plurality of shape-anisotropic members are made of a transparent resin, and include at least red shape-anisotropic members, green shape-anisotropic members, and blue shape-anisotropic members.

16. The display panel according to claim 1, wherein the shape-anisotropic members have a flake shape, a columnar shape, or an ellipsoid shape.

17. The display panel according to claim 1, wherein the shape-anisotropic members are formed in a flake shape that has a surface having recesses and protrusions.

18. The display panel according to claim 13, wherein a thickness of the light modulation layer is set so as to be less than a length of long axes of the shape-anisotropic members, and such that, when the shape-anisotropic members are oriented at an incline at a maximum angle with respect to the first substrate and the second substrate, light reflected by the shape-anisotropic members does not directly travel towards a display surface side.

19. The display panel according to claim 13, wherein colored layers are formed on the first substrate.

20. A display device, comprising:
the display panel according to claim 1; and
a backlight disposed on the first substrate side.

21. The display device according to claim 20, further comprising:
a reflective display mode that performs display by reflecting external light and a transmissive display mode that performs display by transmitting light from the backlight,
wherein display is performed by switching between the reflective display mode and the transmissive display mode.

22. The display device according to claim 21,
wherein, in the reflective display mode, display is performed by the external light being reflected by the shape-anisotropic members, and
wherein, in the transmissive display mode, display is performed by the light from the backlight passing through the light modulation layer,
a display medium layer that is driven by the electronic circuit substrate.

* * * * *